(12) United States Patent
Tee et al.

(10) Patent No.: US 12,257,727 B2
(45) Date of Patent: Mar. 25, 2025

(54) EVENT-DRIVEN VISUAL-TACTILE SENSING AND LEARNING FOR ROBOTS

(71) Applicant: NATIONAL UNIVERSITY OF SINGAPORE, Singapore (SG)

(72) Inventors: Chee Keong Tee, Singapore (SG); Hian Hian See, Singapore (SG); Brian Lim, Singapore (SG); Soon Hong Harold Soh, Singapore (SG); Tasbolat Taunyazov, Singapore (SG); Weicong Sng, Singapore (SG); Sheng Yuan Jethro Kuan, Singapore (SG); Abdul Fatir Ansari, Singapore (IN)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 239 days.

(21) Appl. No.: 18/010,656

(22) PCT Filed: Jun. 15, 2021

(86) PCT No.: PCT/SG2021/050350
§ 371 (c)(1),
(2) Date: Dec. 15, 2022

(87) PCT Pub. No.: WO2021/256999
PCT Pub. Date: Dec. 23, 2021

(65) Prior Publication Data
US 2023/0330859 A1    Oct. 19, 2023

(30) Foreign Application Priority Data
Jun. 15, 2020    (SG) .......................... 10202005663U

(51) Int. Cl.
*B25J 9/00*    (2006.01)
*B25J 9/16*    (2006.01)
(Continued)

(52) U.S. Cl.
CPC ............. *B25J 9/1697* (2013.01); *B25J 9/161* (2013.01); *B25J 13/084* (2013.01); *G06N 3/049* (2013.01)

(58) Field of Classification Search
CPC ........ B25J 9/1697; B25J 9/161; B25J 13/084; B25J 9/1694; B25J 13/08; G06N 3/049;
(Continued)

(56) References Cited

U.S. PATENT DOCUMENTS

2007/0227267 A1    10/2007  Loeb
2012/0247226 A1    10/2012  Muroyama
(Continued)

FOREIGN PATENT DOCUMENTS

CN    108229540 A    6/2018
CN    109990927 A    7/2019
(Continued)

OTHER PUBLICATIONS

A. Billard and D. Kragic, "Trends and challenges in robot manipulation," Science, vol. 364, No. 6446, p. eaat8414, 2019.
(Continued)

Primary Examiner — Ian Jen
(74) Attorney, Agent, or Firm — Volpe Koenig

(57) ABSTRACT

A classifying sensing system, a classifying method performed using a sensing system, a tactile sensor, and a method of fabricating a tactile sensor. The classifying sensing system comprises a first spiking neural network, SNN, encoder configured for encoding an event-based output of a vision sensor into individual vision modality spiking representations with a first output size; a second SNN encoder configured for encoding an event-based output of a tactile sensor into individual tactile modality spiking representations with a second output size; a combination layer configured for merging the vision modality spiking representa- (Continued)

tions and the tactile modality spiking representations; and a task SNN configured to receive the merged vision modality spiking representations and tactile modality spiking representations and output vision-tactile modality spiking representations with a third output size for classification.

14 Claims, 14 Drawing Sheets

(51) Int. Cl.
  *B25J 13/08* (2006.01)
  *G06N 3/049* (2023.01)
(58) Field of Classification Search
  CPC .......... G06N 3/045; G06N 3/084; G06N 3/09; G06V 10/82; G06V 20/64; G05B 2219/40532; G05B 2219/40575; G05B 2219/40577; G01L 5/228; G01L 1/18
  See application file for complete search history.

(56) References Cited

U.S. PATENT DOCUMENTS

| | | | | |
|---|---|---|---|---|
| 2017/0083813 | A1* | 3/2017 | Augustine | G06N 3/063 |
| 2017/0236027 | A1* | 8/2017 | van der Made | G06V 10/82 |
| | | | | 382/158 |
| 2017/0337469 | A1* | 11/2017 | Debes | G06N 3/049 |
| 2019/0001492 | A1* | 1/2019 | Rose | B25J 9/1612 |
| 2020/0331709 | A1* | 10/2020 | Huang | B65G 47/905 |
| 2021/0023715 | A1* | 1/2021 | Zhang | B25J 9/1692 |
| 2023/0154135 | A1* | 5/2023 | Nakagawa | H04N 25/47 |
| | | | | 382/103 |

FOREIGN PATENT DOCUMENTS

| | | |
|---|---|---|
| CN | 110082010 A | 8/2019 |
| CN | 112809679 A | 5/2021 |

OTHER PUBLICATIONS

D. Li, X. Chen, M. Becchi, and Z. Zong, "Evaluating the energy efficiency of deep convolutional neural networks on cpus and gpus," 10 2016, pp. 477-484.
E. Strubell, A. Ganesh, and A. McCallum, "Energy and policy considerations for deep learning in NLP," in Proceedings of the 57th Conference of the Association for Computational Linguistics, ACL 2019, Florence, Italy, Jul. 28-Aug. 2, 2019, vol. 1: Long Papers, 2019, pp. 3645-3650. [Online]. Available: https: //doi.org/10.18653/v1/p19-1355.
M. Pfeiffer and T. Pfeil, "Deep Learning With Spiking Neurons: Opportunities and Challenges," Frontiers in Neuroscience, vol. 12, No. Oct. 2018.
S.-C. Liu, B. Rueckauer, E. Ceolini, A. Huber, and T. Delbruck, "Eventdriven sensing for efficient perception: Vision and audition algorithms," IEEE Signal Processing Magazine, vol. 36, No. 6, pp. 29-37, 2019.
Y. A. LeCun, Y. Bengio, and G. E. Hinton, "Deep learning," Nature, vol. 521, No. 7553, pp. 436-444, 2015.
M. Davies, N. Srinivasa, T. Lin, G. Chinya, Y. Cao, S. H. Choday, G. Dimou, p. Joshi, N. Imam, S. Jain, Y. Liao, C. Lin, A. Lines, R. Liu, D. Mathaikutty, S. McCoy, A. Paul, J. Tse, G. Venkataramanan, Y.Weng, A. Wild, Y. Yang, and H. Wang, "Loihi: A neuromorphic manycore processor with on-chip learning," IEEE Micro, vol. 38, No. 1, pp. 82-99, Jan. 2018.
J. Sinapov, C. Schenck, and A. Stoytchev, "Learning relational object categories using behavioral exploration and multimodal perception," in 2014 IEEE International Conference on Robotics and Automation (ICRA). IEEE, 2014, pp. 5691-5698.

Y. Gao, L. A. Hendricks, K. J. Kuchenbecker, and T. Darrell, "Deep learning for tactile understanding from visual and haptic data," in 2016 IEEE International Conference on Robotics and Automation (ICRA). IEEE, 2016, pp. 536-543.
J. Li, S. Dong, and E. Adelson, "Slip detection with combined tactile and visual information," in 2018 IEEE International Conference on Robotics and Automation (ICRA). IEEE, 2018, pp. 7772-7777.
M. A. Lee, Y. Zhu, K. Srinivasan, P. Shah, S. Savarese, L. Fei-Fei, A. Garg, and J. Bohg, "Making sense of vision and touch: Self-supervised learning of multimodal representations for contact-rich tasks," in 2019 International Conference on Robotics and Automation (ICRA). IEEE, 2019, pp. 8943-8950.
J. Lin, R. Calandra, and S. Levine, "Learning to identify object instances by touch: Tactile recognition via multimodal matching," in 2019 International Conference on Robotics and Automation (ICRA). IEEE, 2019, pp. 3644-3650.
H. Liu, F. Sun et al., "Robotic tactile perception and understanding," 2018.
P. Allen, "Surface descriptions from vision and touch," in Proceedings. 1984 IEEE International Conference on Robotics and Automation, vol. 1. IEEE, 1984, pp. 394-397.
S. Luo, J. Bimbo, R. Dahiya, and H. Liu, "Robotic tactile perception of object properties: A review," Mechatronics, vol. 48, pp. 54-67, 2017.
H. Liu, Y. Yu, F. Sun, and J. Gu, "Visual-tactile fusion for object recognition," IEEE Transactions on Automation Science and Engineering, vol. 14, No. 2, pp. 996-1008, 2016.
H. Soh, Y. Su, and Y. Demiris, "Online spatio-temporal Gaussian process experts with application to tactile classification," in Intelligent Robots and Systems (IROS), 2012 IEEE/RSJ International Conference on. IEEE, 2012, pp. 4489-4496.
J. Varley, D. Watkins, and P. Allen, "Visual-tactile geometric reasoning," in RSS Workshop, 2017.
J. Reinecke, A. Dietrich, F. Schmidt, and M. Chalon, "Experimental comparison of slip detection strategies by tactile sensing with the biotac® on the dlr hand arm system," in 2014 IEEE international Conference on Robotics and Automation (ICRA). IEEE, 2014, pp. 2742-2748.
Y. Bekiroglu, R. Detry, and D. Kragic, "Learning tactile characterizations of object-and pose-specific grasps," in 2011 IEEE/RSJ international conference on Intelligent Robots and Systems. IEEE, 2011, pp. 1554-1560.
Z. Su, K. Hausman, Y. Chebotar, A. Molchanov, G. E. Loeb, G. S. Sukhatme, and S. Schaal, "Force estimation and slip detection/classification for grip control using a biomimetic tactile sensor," in 2015 IEEE-RAS 15th International Conference on Humanoid Robots (Humanoids). IEEE, 2015, pp. 297-303.
W. Yuan, S. Dong, and E. H. Adelson, "Gelsight: High-resolution robot tactile sensors for estimating geometry and force," Sensors, vol. 17, No. 12, p. 2762, 2017.
R. Calandra, A. Owens, D. Jayaraman, J. Lin, W. Yuan, J. Malik, E. H. Adelson, and S. Levine, "More than a feeling: Learning to grasp and regrasp using vision and touch," IEEE Robotics and Automation Letters, vol. 3, No. 4, pp. 3300-3307, 2018.
S. Luo, W. Yuan, E. Adelson, A. G. Cohn, and R. Fuentes, "Vitac: Feature sharing between vision and tactile sensing for cloth texture recognition," in 2018 IEEE International Conference on Robotics and Automation (ICRA). IEEE, 2018, pp. 2722-2727.
G. Gallego, T. Delbr, O. Orchard, C. Bartolozzi, B. Taba, A. Censi, K. Daniilidis, D. Scaramuzza, S. Leutenegger, and A. Davison, "Eventbased Vision : A Survey," Tech. Rep., 2018.
A. Mitrokhin, C. Ye, C. Fermuller, Y. Aloimonos, and T. Delbruck, "EVIMO: Motion Segmentation Dataset and Learning Pipeline for Event Cameras," in 2019 IEEE/RSJ International Conference on Intelligent Robots and Systems (IROS), 2019.
A. Z. Zhu and L. Yuan, "EV-FlowNet: Self-Supervised Optical Flow Estimation for Event-based Cameras," in Robotics: Science and Systems, 2018.
A. I. Maqueda, A. Loquercio, G. Gallego, N. Garcn'nia, and D. Scaramuzza, "Event-based vision meets deep learning on steering prediction for self-driving cars," in Proceedings of the IEEE Conference on Computer Vision and Pattern Recognition, 2018, pp. 5419-5427.

(56) References Cited

OTHER PUBLICATIONS

A. Tavanaei, M. Ghodrati, S. R. Kheradpisheh, T. Masquelier, and A. Maida, "Deep learning in spiking neural networks," Neural Networks, vol. 111, pp. 47-63, 2019. [Online]. Available: https://doi.org/10.1016/j.neunet.2018.12.002.
S. B. Shrestha and G. Orchard, "Slayer: Spike layer error reassignment in time," in Advances in Neural Information Processing Systems, 2018, pp. 1412-1421.
G. Bellec, F. Scherr, E. Hajek, D. Salaj, R. Legenstein, and W. Maass, "Biologically inspired alternatives to backpropagation through time for learning in recurrent neural nets," arXiv preprint arXiv:1901.09049, 2019.
M. Akrout, C. Wilson, P. Humphreys, T. Lillicrap, and D. B. Tweed, "Deep learning without weight transport," in Advances in Neural Information Processing Systems, 2019, pp. 974-982.
P. A. Merolla, J. V. Arthur, R. Alvarez-Icaza, A. S. Cassidy, J. Sawada, F. Akopyan, B. L. Jackson, N. Imam, C. Guo, Y. Nakamura, B. Brezzo, I. Vo, S. K. Esser, R. Appuswamy, B. Taba, A. Amir, M. D. Flickner, W. P. Risk, R. Manohar, and D. S. Modha, "A million spiking-neuron integrated circuit with a scalable communication network and interface," Science, vol. 345, No. 6197, pp. 668-673, 2014. [Online]. Available: https://science.sciencemag.org/content/345/6197/668.
S. Chevallier, H. Paugam-Moisy, and F. Lemaitre, "Distributed processing for modelling real-time multimodal perception in a virtual robot." in Parallel and Distributed Computing and Networks, 2005, pp. 393-398.
N. Rathi and K. Roy, "Stdp-based unsupervised multimodal learning with cross-modal processing in spiking neural network," IEEE Transactions on Emerging Topics in Computational Intelligence, pp. 1-11, 2018.
E. Mansouri-Benssassi and J. Ye, "Speech emotion recognition with early visual cross-modal enhancement using spiking neural networks," in 2019 International Joint Conference on Neural Networks (IJCNN). IEEE, 2019, pp. 1-8.
T. Zhou and J. P. Wachs, "Spiking neural networks for early prediction in human-robot collaboration," The International Journal of Robotics Research, vol. 38, No. 14, pp. 1619-1643, 2019. [Online]. Available: https://doi.org/10.1177/0278364919872252.
J. Konstantinova, A. Jiang, K. Althoefer, P. Dasgupta, and T. Nanayakkara, "Implementation of tactile sensing for palpation in robot-assisted minimally invasive surgery: A review," IEEE Sensors Journal, vol. 14, No. 8, pp. 2490-2501, 2014.
Y. Wu, Y. Liu, Y. Zhou, Q. Man, C. Hu, W. Asghar, F. Li, Z. Yu, J. Shang, G. Liu et al., "A skin-inspired tactile sensor for smart prosthetics," Science Robotics, vol. 3, No. 22, p. eaat0429, 2018.
Q.-J. Sun, X.-H. Zhao, Y. Zhou, C.-C. Yeung, W. Wu, S. Venkatesh, Z.-X. Xu, J. J. Wylie, W.-J. Li, and V. A. Roy, "Fingertip-skin-inspired highly sensitive and multifunctional sensor with hierarchically structured conductive graphite/ polydimethylsiloxane foams," Advanced Functional Materials, vol. 29, No. 18, p. 1808829, 2019.
J. He, P. Xiao, W. Lu, J. Shi, L. Zhang, Y. Liang, C. Pan, S.-W. Kuo, and T. Chen, "A universal high accuracy wearable pulse monitoring system via high sensitivity and large linearity graphene pressure sensor," Nano Energy, vol. 59, pp. 422-433, 2019.
T. Callier, A. K. Suresh, and S. J. Bensmaia, "Neural coding of contact events in somatosensory cortex," Cerebral Cortex, vol. 29, No. 11, pp. 4613-4627, 2019.
W. W. Lee, Y. J. Tan, H. Yao, S. Li, H. H. See, M. Hon, K. A. Ng, B. Xiong, J. S. Ho, and B. C. Tee, "A neuro-inspired artificial peripheral nervous system for scalable electronic skins," Science Robotics, vol. 4, No. 32, p. eaax2198, 2019.
R. S. Johansson and J. R. Flanagan, "Coding and use of tactile signals from the fingertips in object manipulation tasks," Nature Reviews Neuroscience, vol. 10, No. 5, pp. 345-359, 2009.
W. Gerstner, "Time structure of the activity in neural network models," Physical review E, vol. 51, No. 1, p. 738, 1995.
B. Calli, A. Walsman, A. Singh, S. Srinivasa, P. Abbeel, and A. M. Dollar, "Benchmarking in manipulation research: Using the yale-cmuberkeley object and model set," IEEE Robotics Automation Magazine, vol. 22, No. 3, pp. 36-52, Sep. 2015.
D. Coleman, I. Sucan, S. Chitta, and N. Correll, "Reducing the barrier to entry of complex robotic software: a moveit! case study," arXiv preprint arXiv:1404.3785, 2014.
K. Cho, B. van Merri"enboer, C. Gulcehre, D. Bahdanau, F. Bougares, H. Schwenk, and Y. Bengio, "Learning phrase representations using rnn encoder-decoder for statistical machine translation," in Proceedings of the 2014 Conference on Empirical Methods in Natural Language Processing (EMNLP), 2014, pp. 1724-1734.
P. Blouw, X. Choo, E. Hunsberger, and C. Eliasmith, "Benchmarking keyword spotting efficiency on neuromorphic hardware," 2018, arXiv:1812.01739.
J. M. Gandarias, F. Pastor, A. J. Garc'ia-Cerezo, and J. M. G'omezde Gabriel, "Active tactile recognition of deformable objects with 3d convolutional neural networks," in 2019 IEEE World Haptics Conference (WHC). IEEE, 2019, pp. 551-555.
Lee, M.A., et al. Making sense of vision and touch: Self-supervised learning of multimodal representations for contact-rich tasks, 2019 IEEE International Conference on Robotics and Automation (ICRA), Mar. 8, 2019, pp. 8943-8950 [Retrieved on Sep. 22, 2021] <DOI: ARXIV:1810.10191V2> Figure 2; p. 3, A. Modality Encoders; B. Self-supervised Predictions; p. 4, A. PHAC-2 Dataset.
Al-Qaderi, M.D. et al., A Multi=Modal person Recognition System for Social Robots. Applied Sciences 2018, Mar. 6, 2018, vol. 8, No. 387 [Retrieved on Sep. 22, 2021] <DOI: 10.3390/APP8030387> Figure 2, p. 7.
Search Report issued in corresponding European Patent Application No. 21826663.3 on Jun. 17, 2024, consisting of 16 pp.
Rong Xiao. An Event-Driven Categorization Model for AER Image Sensors Using Multispike Encoding and Learning. IEEE Translations on Neural Networks and Learning Systems. Vol. 31. No. 9. Nov. 5, 2019. pp. 3549-3657.
Hian Hian See et al. ST-MNIST-The Spiking Tactile-MNIST Neuromorphic Dataset. arxiv.org. Cornell University Library, 201 Olin Library Cornell Univeristy Ithaca, NY. May 9, 2020.

* cited by examiner e f

EVENT-DRIVEN VISUAL-TACTILE SENSING AND LEARNING FOR ROBOTS

FIELD OF INVENTION

The present invention relates broadly to a classifying sensing system and method, in particular to event-driven visual-tactile sensing and learning for robots.

BACKGROUND

Any mention and/or discussion of prior art throughout the specification should not be considered, in any way, as an admission that this prior art is well known or forms part of common general knowledge in the field.

Many everyday tasks require multiple sensory modalities to perform successfully. For example, consider fetching a carton of soymilk from the fridge [1]; humans use vision to locate the carton and can infer from a simple grasp how much soymilk the carton contains. They are also able to use their sense of sight and touch to lift the object without letting it slip. These actions (and inferences) are performed robustly using a power efficient neural substrate—compared to popular deep learning approaches that use multiple sensor modalities in artificial systems, human brains require far less energy [2], [3].

In the following, a brief overview of work on visual-tactile perception for robotics, and event-driven sensing and learning is provided. In visual-tactile perception for robots, generally, there is a recognition of the importance of multi-modal sensing for robotics which has led to innovations both in sensing and perception methods. Of late, there has been a flurry of papers on combining vision and touch sensing, e.g., [8]-[13]. However, work on visual-tactile learning of objects dates back to (at least) 1984 when vision and tactile data was used to create a surface description of primitive objects [14]; in this early work, tactile sensing played a supportive role for vision due to the low resolution of tactile sensors at the time.

Recent advancements in tactile technology [15] have encouraged the use of tactile sensing for more complex tasks, including object exploration [16] and classification [17], shape completion [18], and slip detection [19], [20]. One popular sensor is the BioTac; similar to a human finger, it uses textured skin, allowing vibration signatures to be used for high accuracy material and object identification and slip detection [21]. The BioTac has also been used in visual-tactile learning, e.g., [9] combined tactile data with RGB images to recognize objects via deep learning. Other recent works have used the Gelsight [22]—an optical-based tactile sensor—for visual-tactile slip detection [10], [23], grasp stability, and texture recognition [24]. Very recent work has used unsupervised learning to generate neural representations of visual-tactile data (with proprioception) for reinforcement learning [11].

In event-based perception, sensors and learning has focused primarily on vision (see [25] for a comprehensive survey). The emphasis on vision can be attributed both to its applicability across many tasks, as well as the recent availability of event cameras such as the DVS and Prophesee Onboard; unlike conventional optical sensors, event cameras capture pixel changes asynchronously. Event-based sensors have been successfully used in conjunction with deep learning techniques [25]. The binary events are first converted into real-valued tensors, which are processed downstream by deep artificial neural networks, ANNs. This approach generally yields good models (e.g., for motion segmentation [26], optical flow estimation [27], and car steering prediction [28]), but at high computational cost.

Neuromorphic learning, specifically Spiking Neural Networks (SNNs) [4], [29], provide a competing approach for learning with event data. Similar to event-based sensors, SNNs work directly with discrete spikes and hence, possess similar characteristics, i.e., low latency, high temporal resolution and low power consumption. Historically, SNNs have been hampered by the lack of a good training procedure. Gradient based methods such as backpropagation were not available because spikes are non-differentiable. Recent developments in effective SNN training [30]-[32] and the nascent availability of neuromorphic hardware (e.g., IBM TrueNorth [33] and Intel Loihi [7]) have renewed interest in neuromorphic learning for various applications, including robotics. SNNs do not yet consistently outperform their deep ANN cousins on pseudo-event image datasets, and the research community is actively exploring better training methods for real event-data.

Embodiments of the present invention seek to address at least one of the above problems.

SUMMARY

In accordance with a first aspect of the present invention, there is provided a classifying sensing system comprising:
  a first spiking neural network, SNN, encoder configured for encoding an event-based output of a vision sensor into individual vision modality spiking representations with a first output size;
  a second SNN encoder configured for encoding an event-based output of a tactile sensor into individual tactile modality spiking representations with a second output size;
  a combination layer configured for merging the vision modality spiking representations and the tactile modality spiking representations; and
  a task SNN configured to receive the merged vision modality spiking representations and tactile modality spiking representations and output vision-tactile modality spiking representations with a third output size for classification.

In accordance with a second aspect of the present invention, there is provided a classifying method performed using a sensing system, the method comprising the steps of:
  encoding, using a first spiking neural network, SNN, encoder an event-based output of a vision sensor into individual vision modality spiking representations with a first output size;
  encoding, using a second SNN encoder, an event-based output of a tactile sensor into individual tactile modality spiking representations with a second output size;
  merging, using a combination layer, the vision modality spiking representations and the tactile modality spiking representations; and
  using a task SNN to receive the merged vision modality spiking representations and tactile modality spiking representations and to output vision-tactile modality spiking representations with a third output size for classification.

In accordance with a third aspect of the present invention, there is provided a tactile sensor comprising:
  a carrier structure;
  an electrode layer disposed on a surface of the carrier structure, the electrode array comprising an array of taxel electrodes;

a plurality of electrode lines individually electrically connected to respective ones of the taxel electrodes;

a protective layer disposed above the electrode layer, wherein the protective layer is made from an elastically deformable material; and a pressure transducer layer disposed between the electrode layer and the protective layer;

wherein electrical signals detectable in the electrode lines responsive to contact forces exerted on the pressure transducer layer via the protective layer provide spatio-temporal data for neuromorphic tactile sensing applications.

In accordance with a fourth aspect of the present invention, there is provided a method of fabricating a tactile sensor, the method comprising:

providing a carrier structure;

providing an electrode layer disposed on a surface of the carrier structure, the electrode array comprising an array of taxel electrodes;

providing a plurality of electrode lines individually electrically connected to respective ones of the taxel electrodes;

providing a protective layer disposed above the electrode layer, wherein the protective layer is made from an elastically deformable material; and providing a pressure transducer layer disposed between the electrode layer and the protective layer;

wherein electrical signals detectable in the electrode lines responsive to contact forces exerted on the pressure transducer layer via the protective layer provide spatio-temporal data for neuromorphic tactile sensing applications.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 1 (b) shows a photograph of a partially cross-sectional view of a NeuTouch event-driven tactile sensor according to an example embodiment.

FIG. 1 (c) shows a photograph of the spatial distribution of the 39 taxels on a NeuTouch NeuTouch event-driven tactile sensor according to an example embodiment.

FIG. 1 (d) shows the pressure response of the transducer in a NeuTouch event-driven tactile sensor according to an example embodiment. A low hysteresis can be observed from the loading and unloading curves.

FIG. 1 (e) shows a graph illustrating the (signature encoded) asynchronous transmission of tactile information from a NeuTouch event-driven tactile sensor according to an example embodiment.

FIG. 1 (f) shows a graph illustrating the decoded tactile information (i.e. events) from a NeuTouch event-driven tactile sensor according to an example embodiment.

FIG. 3 (b) shows a photograph of the 7-DoF Franka Emika Panda arm with a Robotiq 2F-140 gripper of FIG. 3 (a) and an Optitrack motion capture system.

FIG. 8 (b) shows a photograph of the object of FIG. 8(a) during a stable grasp.

FIG. 8 (c) shows a photograph of the object of FIG. 8(a) during unstable grasp with rotational slip.

FIG. 13 (b) shows a graph of $\Theta_t$ (shortest angle in radians) computed between $q_t$ and $q_0$, according to an example embodiment.

DETAILED DESCRIPTION

Figure 1:
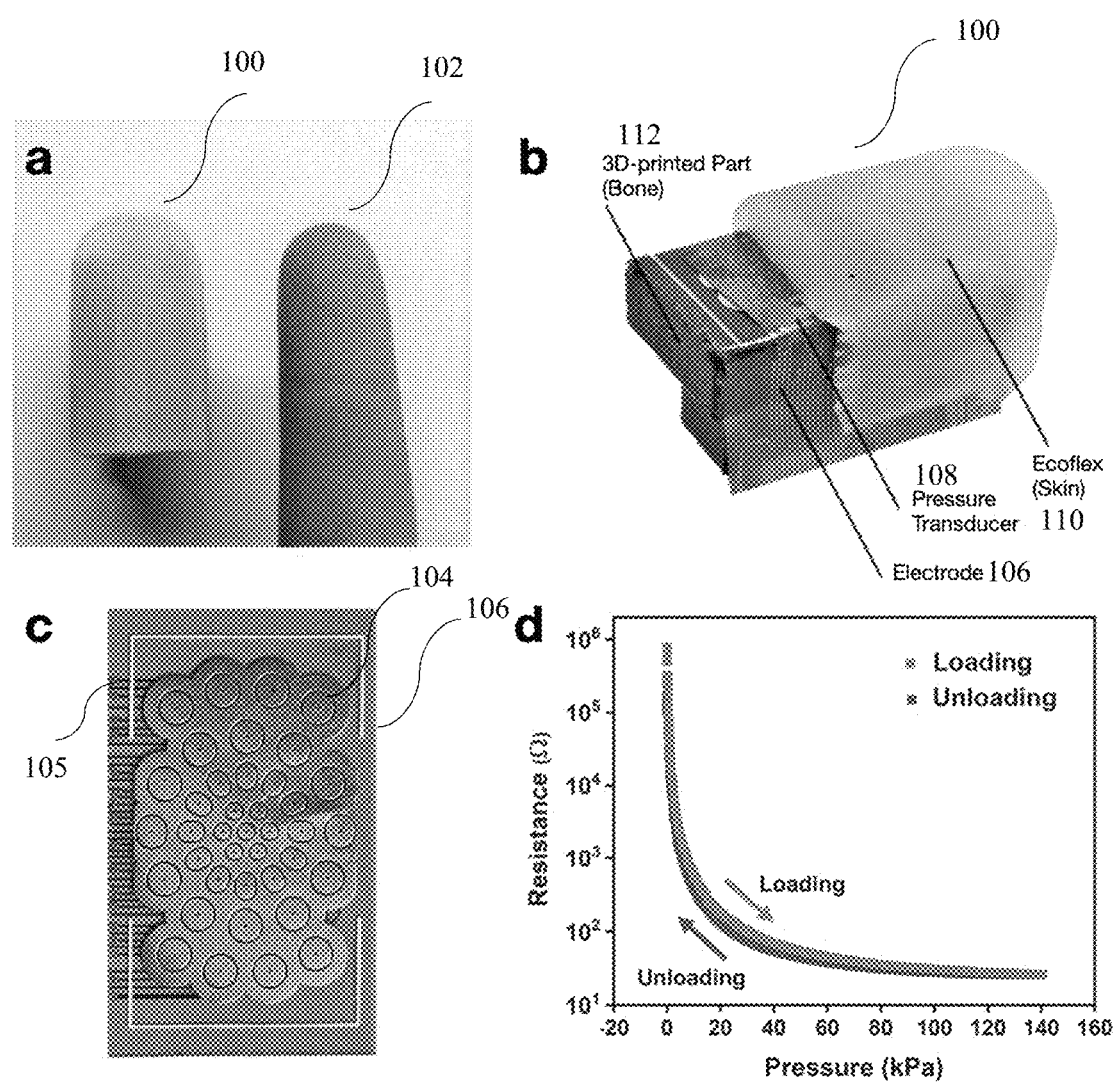
FIG. 1 (a) shows a photograph of a NeuTouch event-driven tactile sensor according to an example embodiment compared to a human finger.
Figure 1:
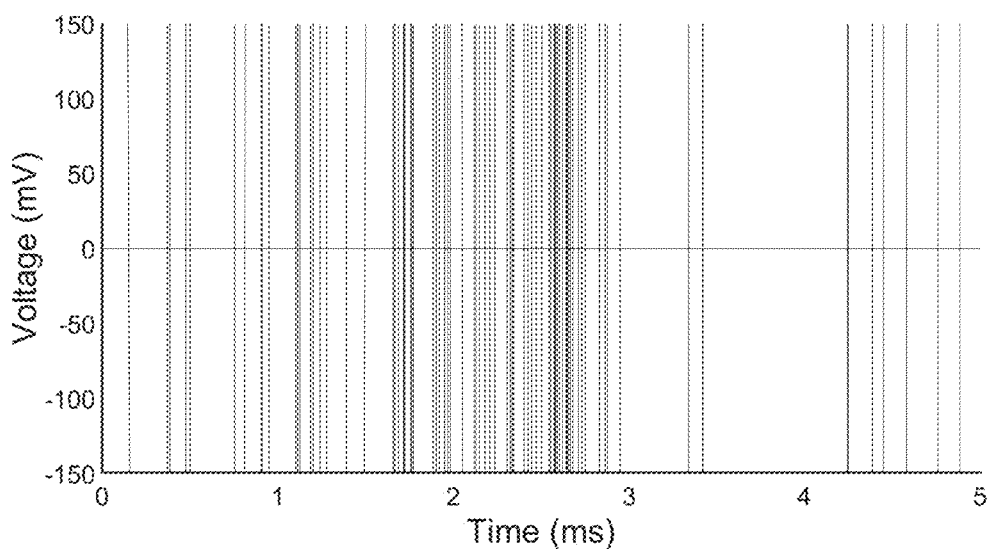
Figure 1:
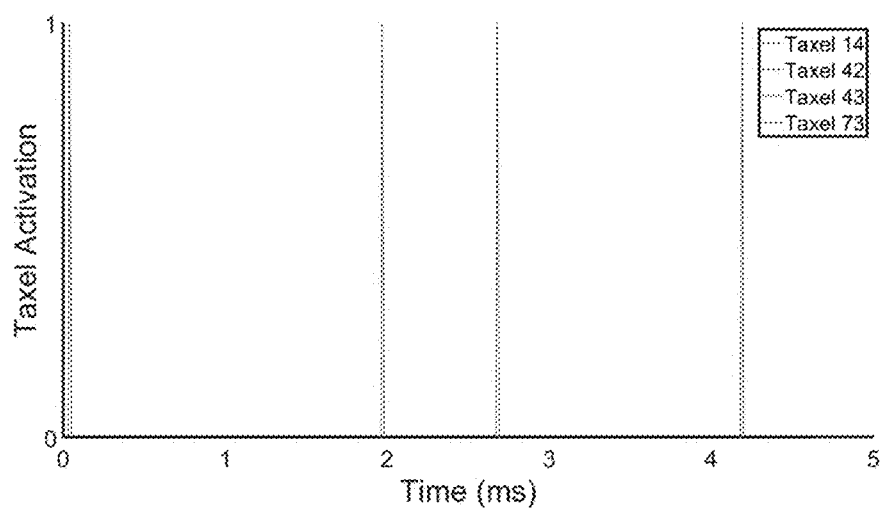

Embodiments of the present invention provide crucial steps towards efficient visual-tactile perception for asynchronous and event-driven robotic systems. In contrast to resource-hungry deep learning methods, event driven perception forms an alternative approach that promises power-efficiency and low-latency—features that are ideal for real-time mobile robots. However, event-driven systems remain under-developed relative to standard synchronous perception methods [4], [5].

To enable richer tactile sensing, a 39-taxel fingertip sensor is provided, according to an example embodiment, referred to herein as NeuTouch. Compared to existing commercially-available tactile sensors, NeuTouch's neuromorphic design enables scaling to a larger number of taxels while retaining low latencies.

Multi-modal learning with NeuTouch and the Prophesee event camera are investigated, according to example embodiments. Specifically, a visual-tactile spiking neural network (VT-SNN) is provided that incorporates both sensory modalities for supervised-learning tasks.

Different from conventional deep artificial neural network (ANN) models [6], SNNs process discrete spikes asynchronously and thus, are arguably better suited to the event data generated by the neuromorphic sensors according to example embodiments. In addition, SNNs can be used on efficient low-power neuromorphic chips such as the Intel Loihi [7].

It is noted that in example embodiments, other event-based tactile sensors may be used. Also, the tactile sensor may comprise a converter for converting an intrinsic output of the tactile sensor into the event-based output of the tactile sensor.

Similarly, it is noted that in example embodiment, other event-based vision sensors may be used. Also, the vision sensor may comprise a converter for converting an intrinsic output of the vision sensor into the event-based output of the vision sensor.

Experiments performed according to example embodiments center on two robot tasks: object classification and (rotational) slip detection. In the former, the robot was tasked to determine the type of container being handled and the amount of liquid held within. The containers were opaque with differing stiffness, and hence, both visual and tactile sensing are relevant for accurate classification. It is shown that relatively small differences in weight (~30 g across 20 object-weight classes) can be distinguished by the prototype sensors and spiking models according to example embodiments. Likewise, the slip detection experiment indicates rotational slip can be accurately detected within 0.08 s (visual-tactile spikes processed every 1 ms). In both experiments, SNNs achieved competitive (and sometimes superior) performance relative to ANNs with similar architecture.

Taking a broader perspective, event-driven perception according to example embodiments represents an exciting opportunity to enable power-efficient intelligent robots. An "end-to-end" event-driven perception framework can be provided according to example embodiments.

NeuTouch according to an example embodiment provides a scalable event-based tactile sensor for robot end-effectors.

A Visual-Tactile Spiking Neural Network according to an example embodiment leverages multiple event sensor modalities.

Systematic experiments demonstrate the effectiveness of an event-driven perception system according to example embodiments on object classification and slip detection, with comparisons to conventional ANN methods.

Visual-tactile event sensor datasets comprising more than 50 different object classes across the experiments using example embodiments were obtained, which also includes RGB images and proprioceptive data from the robot.

Neutouch: An Event-Based Tactile Sensor According to an Example Embodiment

Although there are numerous applications for tactile sensors (e.g., minimal invasive surgery [38] and smart prosthetics [39]), current tactile sensing technology lags behind vision. In particular, current tactile sensors remain difficult to scale and integrate with robot platforms. The reasons are twofold: first, many tactile sensors are interfaced via time-divisional multiple access (TDMA), where individual taxel electrodes, hereafter also referred to as "taxels" are periodically and sequentially sampled. The serial readout nature of TDMA inherently leads to an increase of readout latency as the number of taxels in the sensor is increased. Second, high spatial localization accuracy is typically achieved by adding more taxels in the sensor; this invariably leads to more wiring, which complicates integration of the skin onto robot end-effectors and surfaces.

Motivated by the limitations of the existing tactile sensing technology, a Neuro-inspired Tactile sensor 100 (NeuTouch) is provided according to example embodiments, for use on robot end-effectors (see FIG. 1). The structure of NeuTouch 100 resembles a human fingertip 102: it comprises "skin", and "bone", and has a physical dimension of 37×21×13 mm according to an example embodiment. This design facilitates integration with anthropomorphic end-effectors (for prosthetics or humanoid robots) and standard multi-finger grippers; in the experiments, NeuTouch 100 was used with a Robotiq 2F-140 gripper. It is noted that in addition to a fingertip design, alternative structures can be developed to suit different applications according to different example embodiments.

Specifically, FIG. 1 (a) shows the NeuTouch 100 compared to a human finger 102. FIG. 1 (c) shows the spatial distribution of the 39 taxels e.g. 104 on NeuTouch 100. FIG. 1 (b) shows a partially cross-sectional view of the NeuTouch 100 and its constituent components. NeuTouch 100 performs tactile sensing using an electrode layer 106 with 39 taxels e.g. 104 and a graphene-based piezoresistive thin film 108 as pressure transducer that is embedded beneath a protective Ecoflex "skin" 110, all supported on a 3-D printed part ("bone") 112.

Tactile sensing is achieved via the electrode layer 106 folded around the bone 112 such that the array of electrodes with 39 taxels e.g. 104 are on the "top" of the bone 112 with the graphene-based piezoresistive thin film 108 covering the 39 taxels e.g. 104. The graphene-based piezoresistive thin film 108 functions as a pressure transducer forming an effective tactile sensor [40], [41] due to its high Young's modulus, which helps to reduce the transducer's hysteresis and response time. The radial arrangement of the taxels e.g. 106 on NeuTouch 100 is designed such that the taxel density is varied from high-to-low; from the center to the periphery of the "top" touch surface of the NeuTouch 100 sensor. The initial point-of-contact between the object and sensor is located at the central region of NeuTouch 100 where the taxel e.g. 106 density is the highest, as such the rich spatio-temporal tactile data of the initial contact (between the object and sensor) can be captured. This rich tactile information can help algorithms to accelerate inference (e.g., early classification as will be described in more detail below).

FIG. 1 (d) shows the pressure response of the transducer in the NeuTouch 100, and a low hysteresis can be observed from the loading and unloading curves.

The 3D-printed bone component 112 was employed to serve the role of the fingertip bone, and Ecoflex 00-30 (Ecoflex) 110 was employed to emulate skin for NeuTouch 100. The Ecoflex 110 offers protection for the electrodes/taxels e.g. 104 for a longer use-life and amplifies the stimuli exerted on NeuTouch 100. The latter enables more tactile features to be collected, since the transient phase of contact (between object and sensor) encodes much of the physical description of a grasped object, such as stiffness or surface roughness [42]. The NeuTouch 100 exhibits a slight delay of ~300 ms when recovering from a deformation due to the soft nature of Ecoflex 110. Nevertheless, the experiments described below showed this effect did not impede the NeuTouch's 100 sensitivity to various tactile stimuli.

Compared to existing tactile sensors, NeuTouch 100 is event-based and scales well with the number of taxels; NeuTouch 100 can accommodate 240 taxels according to a non-limiting example embodiment while maintaining an exceptionally low constant readout latency of 1 ms for rapid tactile perception [43]. This is achieved according to example embodiments by leveraging upon the Asynchronously Coded Electronic Skin (ACES) platform [43]—an event-based neuro-mimetic architecture that enables asynchronous transmission of tactile information. With ACES, the taxels e.g. 104 of NeuTouch 100 mimic the function of the fast-adapting (FA) mechano-receptors of a human fingertip, which capture dynamic pressure (i.e., dynamic skin deformations) [44]. FA responses are crucial for dexterous manipulation tasks that require rapid detection of object slippage, object hardness, and local curvature.

Various suitable materials may be used for the fabrication of NeuTouch 100 according to example embodiments, including, but not limited to:

Skin layer: Ecoflex Series (Smooth-On), Polydimethylsiloxane (PDMS), Dragon Skin Series (Smooth-on), Silicone Rubbers.

Transducer layer (Piezoresistive): Velostat (3M), Linqstat Series (Caplinq), Conductive Foam Sheet (e.g., Laird Technologies EMI), Conductive Fabric/textile (e.g., 3M), any piezoresistive material.

Electrode layer: Flexible printed circuit boards (Flex PCBs) of different thickness. Material: Polyimide Electrode lines: Metallic layers of traces, e.g. copper. Any conductive metal (e.g. silver)

Taxels: Copper, any conductive metal (e.g. silver)

Asynchronous Transmission of Tactile Stimuli According to Example Embodiments

Compared to existing tactile sensors, NeuTouch 100 is event-based and scales well with the number of taxels e.g. 104, and can maintain an exceptionally low constant readout latency of 1 ms for rapid tactile perception. This is achieved according to an example embodiment by leveraging upon the Asynchronously Coded Electronic Skin (ACES) platform [50]—an event-based neuro-mimetic architecture that enables asynchronous transmission of tactile information. It was developed to address the increasing complexity and need for transferring a large array of skin-like transducer inputs while maintaining a high level of responsiveness (i.e., low latency).

With ACES, the taxels e.g. 104 of NeuTouch 100 mimic the function of the fast-adapting (FA) mechano-receptors of a human fingertip, which capture dynamic pressure (i.e., dynamic skin deformations). Transmission of the tactile stimuli information is in the form of asynchronous spikes (i.e., electrical pulses), similar to biological systems; data is transmitted by individual taxels e.g. 104 only when necessary via single common conductor for signalling. This is made possible by encoding the taxels e.g. 104 of NeuTouch 100 with unique electrical pulse signatures. These signatures are robust to overlap and permit multiple taxels e.g. 104 to transmit data without specific time synchronization (see FIG. 1 (e)). Therefore, stimuli information of all the activated taxels e.g. 104 can be combined and propagated upstream to the decoder via a single electrical conductor. This yields lower readout latency and simpler wiring. The decoder correlates the received pulses (i.e., the combined pulse signatures) against each taxel's e.g. 104 known signature to retrieve the spatio-temporal tactile information (see FIG. 1 (e)). Each "signature" is a sequence of spikes, i.e. if one taxel "fires", a time sequence of spikes instead of a single spike is generated, which can be identified in the decoder, for output of a sequence of (single) spikes for each identified taxel that has fired, see FIG. 1 (e).

In an example embodiment, each taxel e.g. 104 connects, via electrode lines e.g. 105, to an encoder, (e.g., if there are 39 taxels, there will be 39 encoders). The signal outputs of the encoders are combined into one "common" output conductor for data transmission to a decoder. The decoder will then decode the combined pulse (spike) signature to identify the activated taxels.

Real-time decoding of the tactile information (acquired by NeuTouch 100) is done via a Field Programmable Gated Array (FPGA) according to an example embodiment. The event-based tactile information can be easily accessed through Universal Asynchronous Receiver/Transmitter (UART) readout to a PC, according to an example embodiment.

For more information on asynchronous transmission of tactile stimuli for event based tactile sensors suitable for us in example embodiments, reference is made to WO 2019/112516.

Details of how the decoded tactile event data is used for learning and classification according to example embodiments will be described below.

Visual-Tactile Spiking Neural Network (VT-SNN) According to Example Embodiments

As mentioned above, the successful completion of many tasks is contingent upon using multiple sensory modalities. In example embodiments, the focus is on touch and sight, i.e., tactile and visual data from NeuTouch 100 and an event-based camera, respectively, are fused via a spiking neural model. This Visual-Tactile Spiking Neural Network (VT-SNN) enables learning and perception using both these modalities, and can be easily extended to incorporate other event sensors according to different example embodiments.

Model Architecture According to Example Embodiments.

Figure 2:
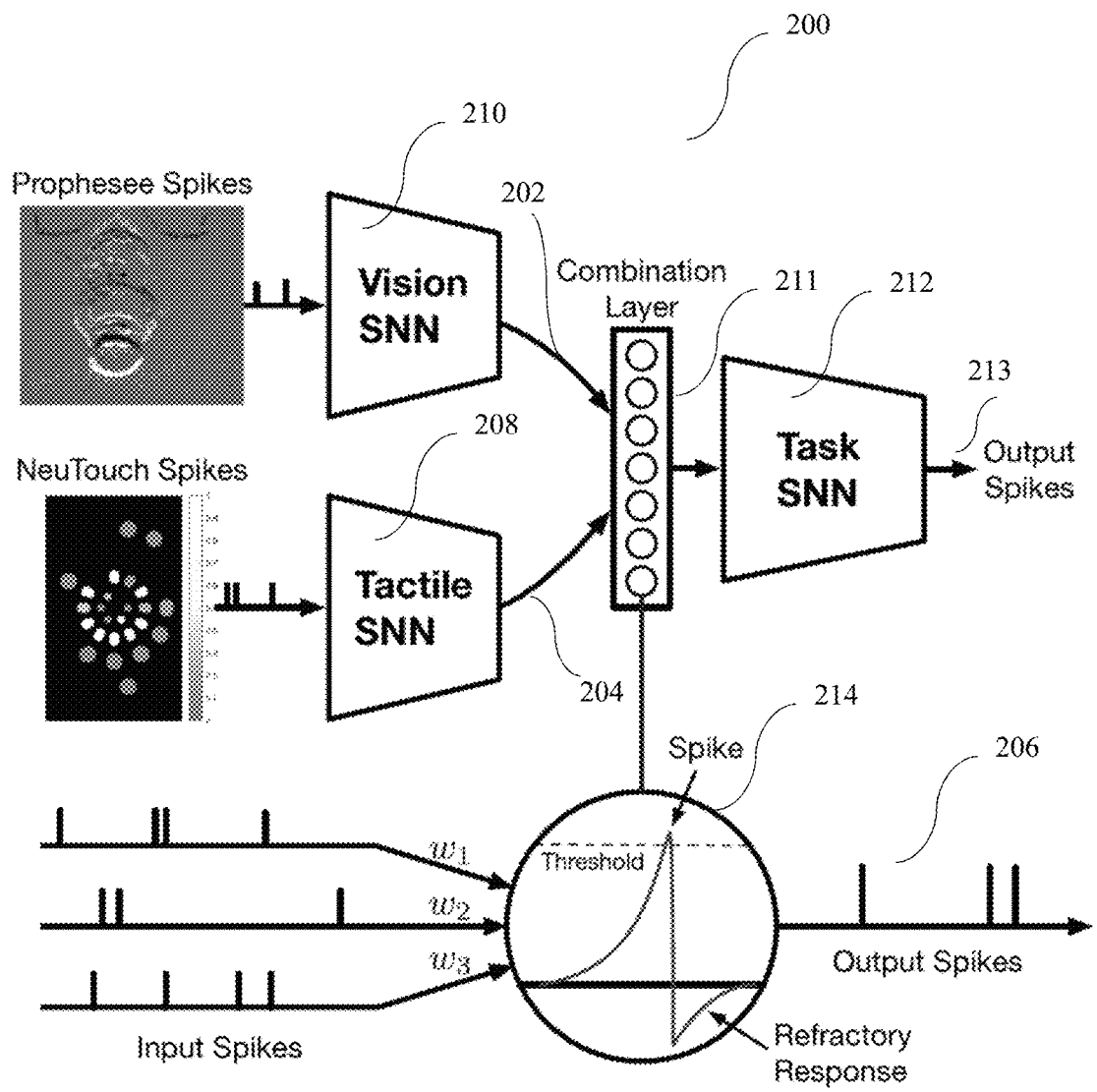
FIG. 2 shows a schematic representation of the architecture of a visual-tactile spiking neural network (VT-SNN) according to example embodiment that first encodes the two modalities into individual latent (spiking) representations, that are combined in a combination layer and further processed through additional layers to yield a task-specific output.

From a bird's-eye perspective, the VT-SNN 200 according to example embodiments employs a simple architecture (see FIG. 2) that first encodes the two modalities into individual latent (spiking) representations, indicated at numerals 202, 204, that are combined in combination layer 211 and further processed through additional layers to yield a task-specific output 213.

In the following, details of the precise network structures used in one example embodiment will be described, but VT-SNN may use alternative network structures for the Tactile, Vision and Task SNNs, according to different example embodiments. The Tactile SNN 208 employs a fully connected (FC) network consisting of 2 dense spiking layers (it is noted that in preliminary experiments, convolutional layers were also tested according to other example embodiments, but it resulted in poorer performance). It has an input size of 156 (two fingers, each with the 39 taxels with a positive and negative polarity channel per taxel) and a hidden layer size of 32. The input into the Tactile SNN 208 is obtained via the signature decoder described above with reference to FIGS. 1 (e) and (f), see specifically FIG. 1 (f) for an output example of the decoder. The Vision SNN 210 uses 3 layers; the first layer is a pooling layer with kernel size and stride length of 4. The pooled spike train is passed as input to a 2-layer FC architecture identical to the Tactile SNN 208. The tactile and vision encoders have output sizes of 50 and 10, respectively (several different dimension sizes were tested according to example embodiments, and a 50-10 encoding gave the best results). The encoded spike-trains of both modalities are merged in combination layer 211, and passed into a dense spiking layer (i.e. task SNN 212) that generates output spikes 206. It is noted that the bottom of FIG. 2 (SRM model) shows the operation of a single neuron in the combination layer 211. The SRM model is used in all layers in the neural network, including the tactile, vision and task SNNs, 208, 210, task SNN 212, and the combination layer, in an example embodiment. The output spikes 206 are input to task SNN 212. The bottom of FIG. 2 indicates only a subset of the various inputs into a single neuron for illustrative purposes, there being usually many more such inputs, as will be appreciated by a person skilled in the art. Note that the output dimensionality (output 213) of the task SNN 212 is dependent on the task: 20 for container & weight classification, and 2 for rotational slip classification. The model architectures are agnostic to the size of the input time dimension, and the same model architectures are used in both classification tasks.

Neuron Model According to Example Embodiments

The Spike Response Model (SRM) [30], [45] was used in example embodiments. In the SRM, spikes are generated whenever a neuron's internal state ("membrane potential") u(t) exceeds a predefined threshold φ. Each neuron's internal state is affected by incoming spikes and a refractory response:

$$u(t) = \Sigma w_i(\varepsilon * s_i)(t) + (v + o)(t) \quad (1)$$

where $w_i$ is a synaptic weight, * indicates convolution, $s_i(t)$ are the incoming spikes from input i, ε(−) is the response kernel, v(−) is the refractory kernel, and o(t) is the neuron's output spike train 206. In words, incoming spikes $s_i(t)$ are convolved with a response kernel ε(−) to yield a spike response signal that is scaled by a synaptic weight $w_i$. That is, and with reference again to FIG. 2, the Visual-Tactile Spiking Neural Network (VT-SNN) 200 comprises two "spiking encoders" 208, 210 for each modality. The spikes from these two encoders are combined via a fixed-width combination layer 210 and propagated to a task SNN 212 that outputs a task-specific output spike-train 213. VT-SNN 200 employs the Spike Response Model (SRM) neuron that integrates incoming spikes and spikes when a threshold is breached, indicated at numeral 214.

Model Training According to Example Embodiments

The spiking networks were optimized using SLAYER [30] in example embodiments. As mentioned above, the derivative of a spike is undefined, which prohibits a direct application of backpropagation to SNNs. SLAYER overcomes this problem by using a stochastic spiking neuron approximation to derive an approximate gradient, and a temporal credit assignment policy to distribute errors. SLAYER trains models "offline" on GPU hardware. Hence, the spiking data needs to be binned into fixed-width intervals during the training process, but the resultant SNN model can be run on neuromorphic hardware. A straight-forward binning process was used in an example embodiment where the (binary) value for each bin window $V_w$ was 1 whenever the total spike count in that window $V_w$ exceeded a threshold value $S_{min}$:

$$V_w = \begin{cases} 1 & \Sigma_w S \geq S_{min} \\ 0 & \text{otherwise} \end{cases} \quad (2)$$

Following [30], class prediction is determined by the number of spikes in the output layer spike train; each output neuron is associated with a specific class and the neuron that generates the most spikes represents the winning class. The model was trained in an example embodiment by minimizing the loss:

$$\mathcal{L} = \frac{1}{2} \sum_{n=0}^{T} \left( \sum_{t=0}^{T} s^n(t) - \sum_{t=0}^{T} \hat{s}^n(t) \right)^2 \quad (3)$$

which captures the difference between the observed output spike count $\Sigma_{t=0}^{T} s(t)$ and the desired spike count $$\sum_{t=0}^{T} \hat{s}(t)$$

for output neuron o (indexed by n).

A generalization of the spike-count loss in equation (3) is introduced to incorporate temporal weighting:

$$\mathcal{L}_\omega = \frac{1}{2} \sum_{n=0}^{N_o} \left( \sum_{t=0}^{T} \omega(t) s^n(t) - \sum_{t=0}^{T} \omega(t) \hat{s}^n(t) \right)^2 \quad (4)$$

$\mathcal{L}_\omega$ is referred to as the weighted spike-count loss. In the experiments, ω(t) is set to be monotonically decreasing, which encourages early classification by down-weighting later spikes. Specifically, a simple quadratic function is used, $\omega(t) = \beta t^2 + \gamma$ with 3<0, but other forms may be used in different example embodiments. For both $\mathcal{L}$ and $\mathcal{L}_\omega$, appropriate counts are specified for the correct and incorrect classes and are task-specific hyperparameters. The hyperparameters were tuned manually and it was found that setting the positive class count to 50% of the maximum number of spikes (across each input within the considered time interval) worked well. In initial trials, it was observed that training solely with the losses above led to rapid over-fitting and poor performance on a validation set. Several techniques to mitigate this issue were explored (e.g., $\ell_1$ regularization and dropout), and it was found that simple $l_2$ regularization led to the best results.

Robot and Sensors Setup According to Example Embodiments

Figure 3:
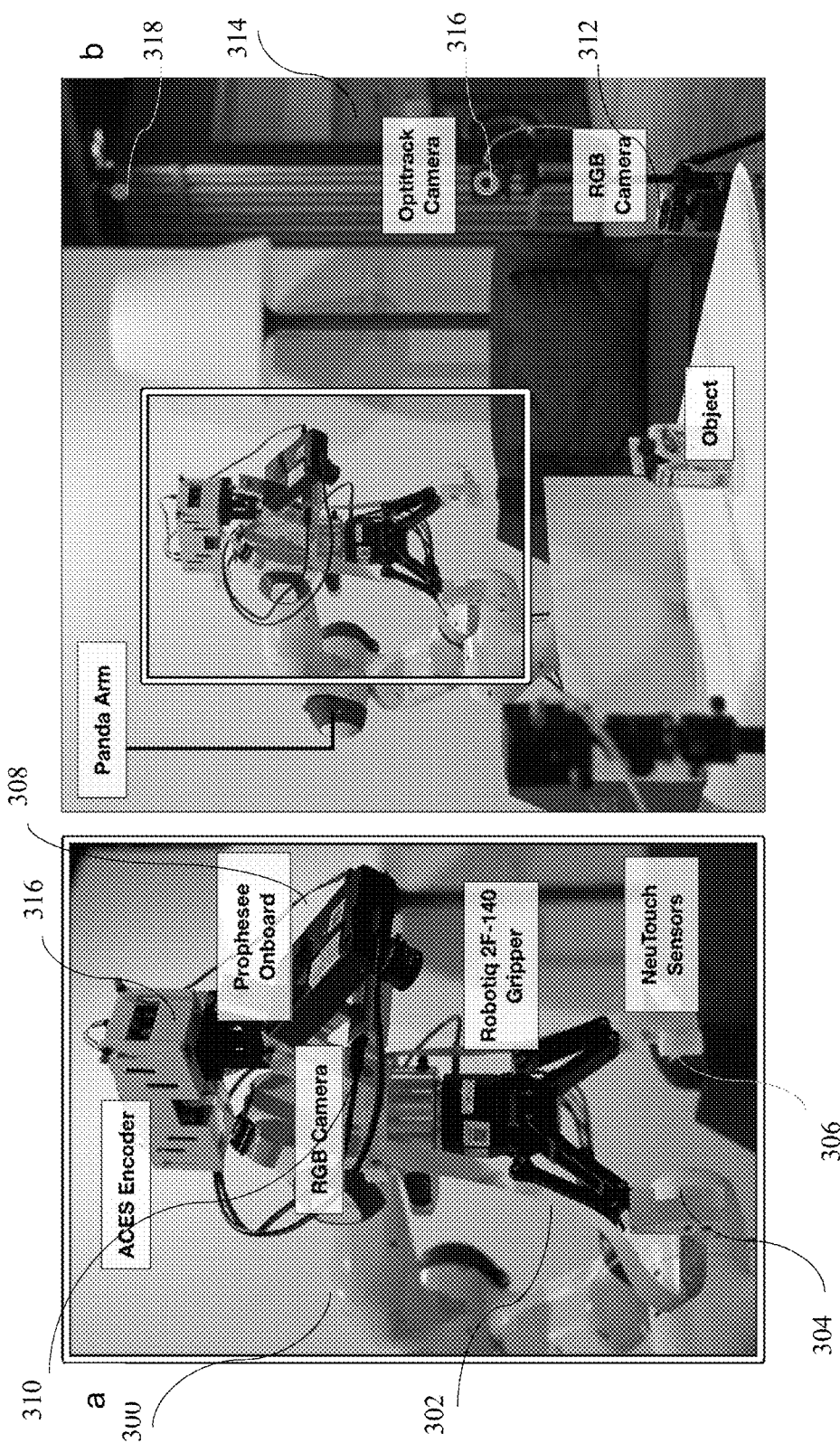
FIG. 3 (a) shows photograph of a 7-DoF Franka Emika Panda arm with a Robotiq 2F-140 gripper equipped with NeuTouch event-driven tactile sensors according to an example embodiment, Prophesee Onboard even-based camera, RGB camera.

FIG. 3 shows the robot hardware setup used across the experiments, according to an example embodiment. A 7-DoF Franka Emika Panda arm 300 with a Robotiq 2F-140 gripper 302 and collected data from four primary sensors types: NeuTouch 304, 306, Prophesee Onboard 308, RGB camera 310, and the Optitrack motion capture system 314. The latter two are non-event sensors and their data streams were not used in VT-SNN.

Neutouch Tactile Sensor According to an Example Embodiment

Two NeuTouch sensors 304, 306 were mounted to the Robotiq 2F-140 gripper 302 and the ACES decoder 316 was mounted on the Panda arm 300 (FIG. 3 (*a*)). To ensure consistent data, a sensor warm-up was performed before each data collection session and baseline results obtained to check for sensor drift. Specifically, during the warm-up 100 cycles of: closing the gripper onto a flat stiff object (the '9 hole peg test' from the YCB dataset [46]) for 3 seconds, opening the gripper, and pausing for 2 seconds, were repeated. A set of benchmark data was then collected, i.e., 20 repetitions of closing the gripper onto the same '9 hole peg test' for 3 seconds. Throughout the experiments, periodic testing for sensor drift by repeating the closing test on the '9 hole peg test' as described above and then examining the sensor data was performed; no significant drift was found throughout the experiments.

Prophesee Event Camera According to an Example Embodiment.

Event-based vision data was captured using the Prophesee Onboard (https://www.prophesee.ai) 308. Similar to the tactile sensor, each camera pixel fires asynchronously and a positive (negative) spike is obtained when there is an increase (decrease) in luminosity. The Prophesee Onboard 308 was mounted on the arm 300 and pointed towards the gripper 302 to obtain information about the object of interest (FIG. 3 (a)). Although the camera 308 has a maximum resolution of 640×480, spikes were captured from a cropped 200×250 rectangular window according to an example embodiment to minimize noise from irrelevant regions. The event camera 308 bias parameters were tuned following recommended guidelines (https://support.prophesee.ai/portal/kb/articles/bias-tuning) and the same parameters were used throughout all experiments. Table 1 shows selected key biases using Prophesee's conventions; noting that the parameter values are unitless. During preliminary experiments, it was found that the Prophesee Onboard 308 was sensitive to high frequency 100 Hz) luminosity changes; in other words, flickering light bulbs triggered undesirable spikes. To counter this effect, six Philips 12 W LED White light bulbs mounted around the experiment setup were used to provide consistent non-flickering illumination.

TABLE 1

(Prophesee Biases)

| Bias | Value | Remarks |
|---|---|---|
| bias_fo | 1775 | Pixel low-pass cut-off frequency |
| bias_hpf | 1800 | Pixel high-pass cut-off frequency |
| bias_pr | 1550 | Controls photo-receptor |
| bias_diff_on | 435 | Sensitivity to positive change in luminosity |
| bias_diff_off | 198 | Sensitivity to negative change in lumnosity |
| bias_refr | 1500 | Pixel refractory period |

RGB Cameras According to an Example Embodiment

Two Intel RealSense D435s RGB cameras 310, 312 were used to provide additional non-event image data (The infrared emitters were disabled as they increased noise for the event camera and hence, no depth data was recorded). The first camera 310 was mounted on the end-effector with the camera 310 pointed towards the gripper 302 (providing a view of the grasped object), and the second camera 312 was placed to provide a view of the scene. The RGB images were used for visualization and validation purposes, but not as input to the models; integration of these standard sensors to provide even better model performance can be provided according to different example embodiments OptiTrack According to an Example Embodiment The OptiTrack motion capture system 314 was used to collect object movement data for the slip detection experiment. 6 reflective markers were attached on the rigid parts of the end-effector and 14 markers on the object of interest. Eleven OptiTrack Prime 13 cameras were placed strategically around the experimental area to minimize tracking error (see e.g. 316, 318 in FIG. 3 (b)); each marker was visible to most if not all cameras at any instance, which resulted in continuous and reliable tracking. Motive Body v1.10.0 was used for marker tracking and the detected markers were manually annotated. From initial tests, it was found that the OptiTrack system 314 gave reliable position estimates with error 1 mm at 120 Hz.

3D-Printed Parts for Use in an Example Embodiment

In an example embodiment, the visual-tactile sensor components are mounted to the robot via 3D printed parts. There are three main 3D printed parts in an example embodiment: a main holder (FIG. 10) to mount Intel Realsense D435, Prophesee Onboard and ACES encoder to the Franka Emika Panda arm, an enclosure for the ACES encoder (FIG. 11), and a coupler to mount the NeuTouch fingers onto Robotiq 2F-140 (FIG. 12). All of the 3D printed parts were printed using Acrylonitrile Butadiene Styrene (ABS) with layer thickness set to 0:2 mm. Total weight was minimised while maintaining structural integrity by maximizing the infills of only a select few components.

Figure 10:
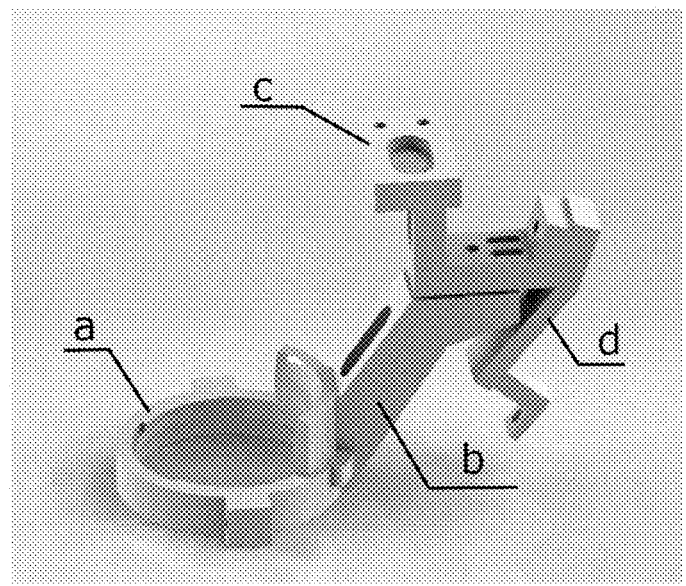
FIG. 10 shows a photograph of a 3D-printed main holder for use in according to an example embodiment.

Specifically, in FIG. 10 the 3D-printed main holder 1000 has four parts: a) a semi-arc to secure main holder to the 7th link of the Panda arm (infill 99%); b) connector to attach sensors to the Panda (infill 99%); c) a base for mounting the enclosure of ACES encoder (infill 80%); (d) a holder for the Intel RealSense D435 and Prophesee Onboard (infill 80%).

Figure 11:
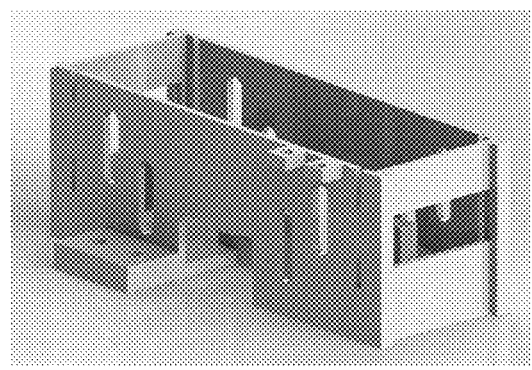
FIG. 11 shows a photograph of an enclosure for the ACES encoder for use in according to an example embodiment.
Figure 12:
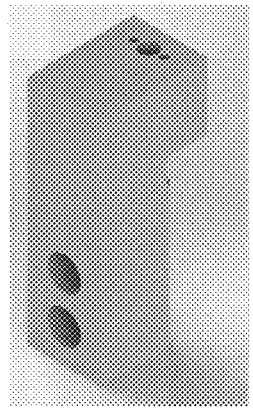
FIG. 12 shows a photograph of a coupler for NeuTouch for use in according to an example embodiment.

With reference to FIGS. 11 and 12, the enclosure 1200 for the ACES encoder is designed with an infill of 65%, and the coupler for NeuTouch is designed with an infill of 99%.

Further Details According to an Example Embodiment.

In addition to the above sensors, proprioceptive data was also collected for the Panda arm 300 and Robotiq gripper 302; these were not currently used in the models but can be included in different example embodiments.

Minimizing phase shift is critical, so that machine learning models can learn meaningful interactions between the different modalities. The setup according to an example embodiment spanned across multiple machines, each having an individual Real Time Clock (RTC). Chronyd was used to sync the various clocks to the Google Public NTP pool time servers. During data collection, for each machine, the record-start time is logged according to its own RTC, and thus it was possible to retrieve differences between the different RTCs and sync them accordingly during data pre-processing.

Figure 13:
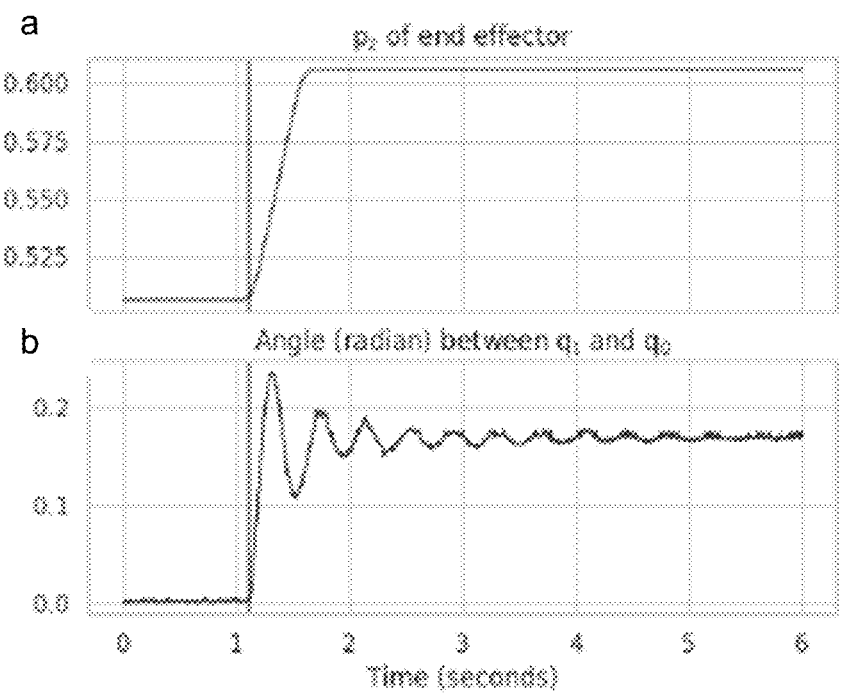
FIG. 13 (a) shows a graph of $p_z$ of the end-effector across time, according to an example embodiment.

In the data collection procedure, rotational slip typically happened in the middle of a recording. In order to extract the relevant portion of the data when slip occurred, the slip onset was first detected and annotated. OptiTrack markers were attached on Panda's end-effector and the object, such that the OptiTrack was able to determine their poses. FIG. 13 visualizes the OptiTrack data for a typical slipping data point. The OptiTrack frame $f_{lift}$ was annotated when the robot first lifted the object up using the following heuristic:

$$\frac{1}{120}\sum_{s=1}^{120}I(p_{z,j} > p_{z,i}) > 0.98 = \begin{cases} \text{False} & j = f_{lift} - 1 \\ \text{True} & j \geq f_{lift} \end{cases}$$

It was checked when $p_z$ departed the empirical noise distribution within $f_{1;...;120}$ when the robot arm was stationary.

For object orientation, the change in angle from at rest was calculated using $$\theta_r = \cos^{-1}(2(q_0, q_t)^2 - 1)$$

where $q_0$ is the quaternion orientation at rest. Similarly, the frame $f_{slip}$ when the object first rotates was annotated using the following heuristic:

$$\frac{1}{120}\sum_{i=1}^{120} I(\theta_j > \theta_i) > 0.98 = \begin{cases} \text{False} & j = f_{slip} - 1 \\ \text{True} & j \geq f_{slip} \end{cases}$$

It was found that the time it took for the object to rotate upon lifting was on average 0.03 seconds across all of the slipping data points.

FIG. 13 (a) shows a graph of $p_z$ of end-effector across time. As the robot arm lifts the object up, $p_z$ increases. FIG. 13 (b) shows a graph of $\Theta_r$ (shortest angle in radians) computed between $q_r$ and $q_0$. This increases as the object slips. In FIG. 13 (a), the vertical line indicates the point where $p_z$ increases significantly from at rest, and in FIG. 13 (b) the vertical line indicates the point where $\Theta_r$ increases significantly from at rest. The difference is 0.03 seconds for this data point.

I. Container & Weight Classification According to Example Embodiments

A first experiment applies the event-driven perception framework—comprising NeuTouch, the Onboard camera, and the VT-SNN according to example embodiments—to classify containers with varying amounts of liquid. The primary goal was to determine if the multi-modal system according to example embodiments was effective at detecting differences in objects that were difficult to isolate using a single sensor. It is noted that the objective was not to derive the best possible classifier; indeed, the experiment did not include proprioceptive data which would likely have improved results [11], nor conduct an exhaustive (and computationally expensive) search for the best architecture. Rather, the experiments were designed to study the potential benefits of using both visual and tactile spiking data in a reasonable setup, according to example embodiments.

I.1. Methods and Procedure According to Example Embodiments

I.1.1. Objects Used According to Example Embodiments

Figure 5:
FIG. 5 shows a photograph of containers used for container classification task: coffee can, plastic soda bottle, soy milk carton, and metal tuna can, for a classification task using a VT-SNN according to an example embodiment.

Four different containers were used: an aluminium coffee can, a plastic Pepsi bottle, a cardboard soy milk carton and a metal tuna can (see FIG. 5). These objects have different degrees of hardness; the soy milk container was the softest, and the tuna can was the most rigid. Because of size differences, each container was filled with differing amounts of liquid; the four objects contained a maximum of 250 g, 400 g, 300 g, and 140 g, respectively (the tuna can did not have a cover and it was filled with a packet of rice to avoid spills and possible liquid damage. The tuna can was placed with the open side facing downwards so, the rice was not visible). For each object, data for 0%, 25%, 50%, 75%, 100% g of the respective maximum amount was collected. This resulted in 20 object classes comprising the four containers with five different weight levels each.

I.1.2. Robot Motion According to Example Embodiments

The robot would grasp and lift each object class fifteen times, yielding 15 samples per class. Trajectories for each part of the motion was computed using the MoveIt Cartesian Pose Controller [47]. Briefly, the robot gripper was initialized 10 cm above each object's designated grasp point. The end-effector was then moved to the grasp position (2 seconds) and the gripper was closed using the Robotiq grasp controller with a force setting of 1 (4 seconds). The gripper then lifted the object by 5 cm (2 seconds) and held it for 0.5 seconds.

I.1.3. Data Pre-Processing According to Example Embodiments

Figure 4:
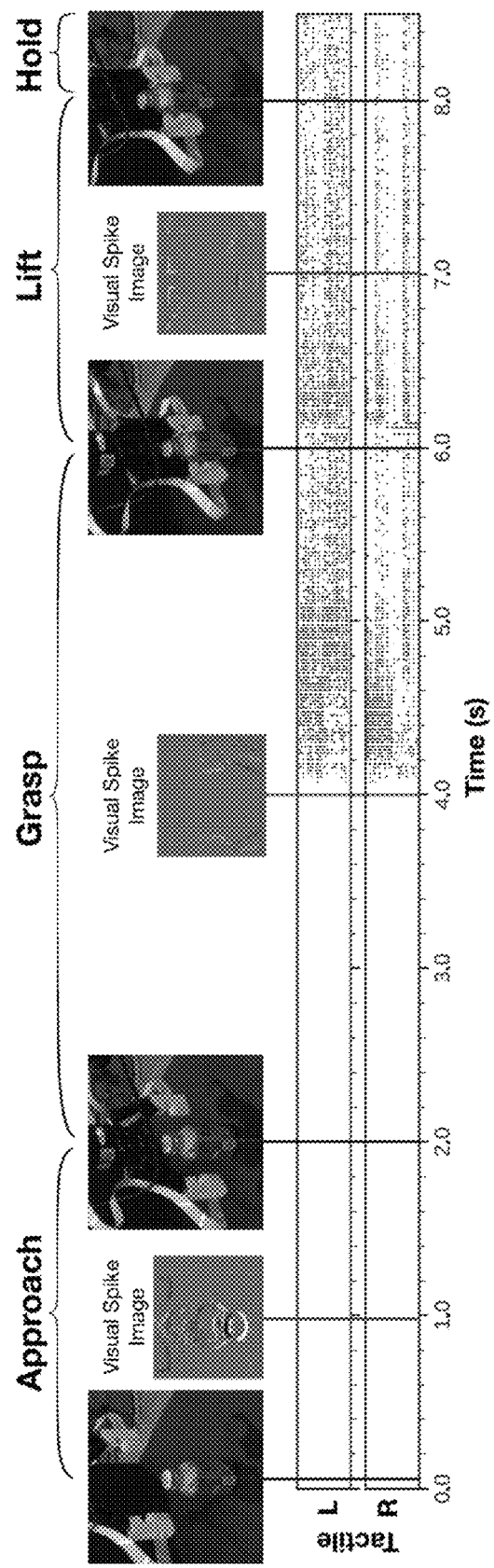
FIG. 4 shows a graph with visual Spike images and phonographs illustrating tactile and visual data from the grasping, lifting and holding phases for training and testing of a VT-SNN according to an example embodiment.

For both modalities, data from the grasping, lifting and holding phases (corresponding to the 2.0 s to 8.5 s window in FIG. 4) were selected, and a bin duration of 0.02 s (325 bins) and a binning threshold value Smin=2 were set. Stratified K-folds were used to create 5 splits; each split contained 240 training and 60 test examples with equal class distribution.

I.1.4. Classification Models, Including VT-SNN According to an Example Embodiment The SNNs were compared against conventional deep learning, specifically Multi-layer Perceptrons (MLPs) with Gated Recurrent Units (GRUs) [48] and 3D convolutional neural networks (CNN-3D) [51]. Each model was trained using (i) the tactile data only, (ii) the visual data only, and (iii) the combined visual-tactile data, noting that the SNN model on the combined data corresponds to the VT-SNN according to an example embodiment. When training on a single modality, Visual or Tactile SNN were used as appropriate. All the models were implemented using PyTorch. The SNNs were trained with SLAYER to minimize spike count differences [30] and the ANNs were trained to minimize the cross-entropy loss using RMSProp. All models were trained for 500 epochs.

I.2. Results and Analysis

I.2.1. Model Comparisons, Including VT-SNN According to an Example Embodiment The test accuracies of the models are summarized in Table 2. The tactile only modality SNN gives 12% higher accuracy than the vision only modality. The multimodal VT-SNN model according to an example embodiment achieves the highest score of 81%, an improvement of over 11% compared to the tactile modality variant. It is noted that a closer examination of the vision only modality data showed that (i) the Pepsi bottle was not fully opaque and the water level was observable by Onboard on some trials, and (ii) the Onboard was able to see object deformations as the gripper closed, which revealed the "fullness" of the softer containers. Hence, the vision only modality results were better than anticipated.

TABLE 2

| Model | Tactile | Vision | Combined |
|---|---|---|---|
| SNN ($\mathcal{L}$) | 0.71 (0.045) | 0.73 (0.064) | 0.81 (0.039) |
| SNN ($\mathcal{L}_\infty$) | 0.71 (0.023) | 0.72 (0.065) | 0.80 (0.048) |
| ANN (MLP-GRU) | 0.50 (0.059) | 0.43 (0.054) | 0.44 (0.062) |
| ANN (CNN-3D) | 0.75 (0.061) | 0.68 (0.022) | 0.80 (0.041) |

Figure 6:
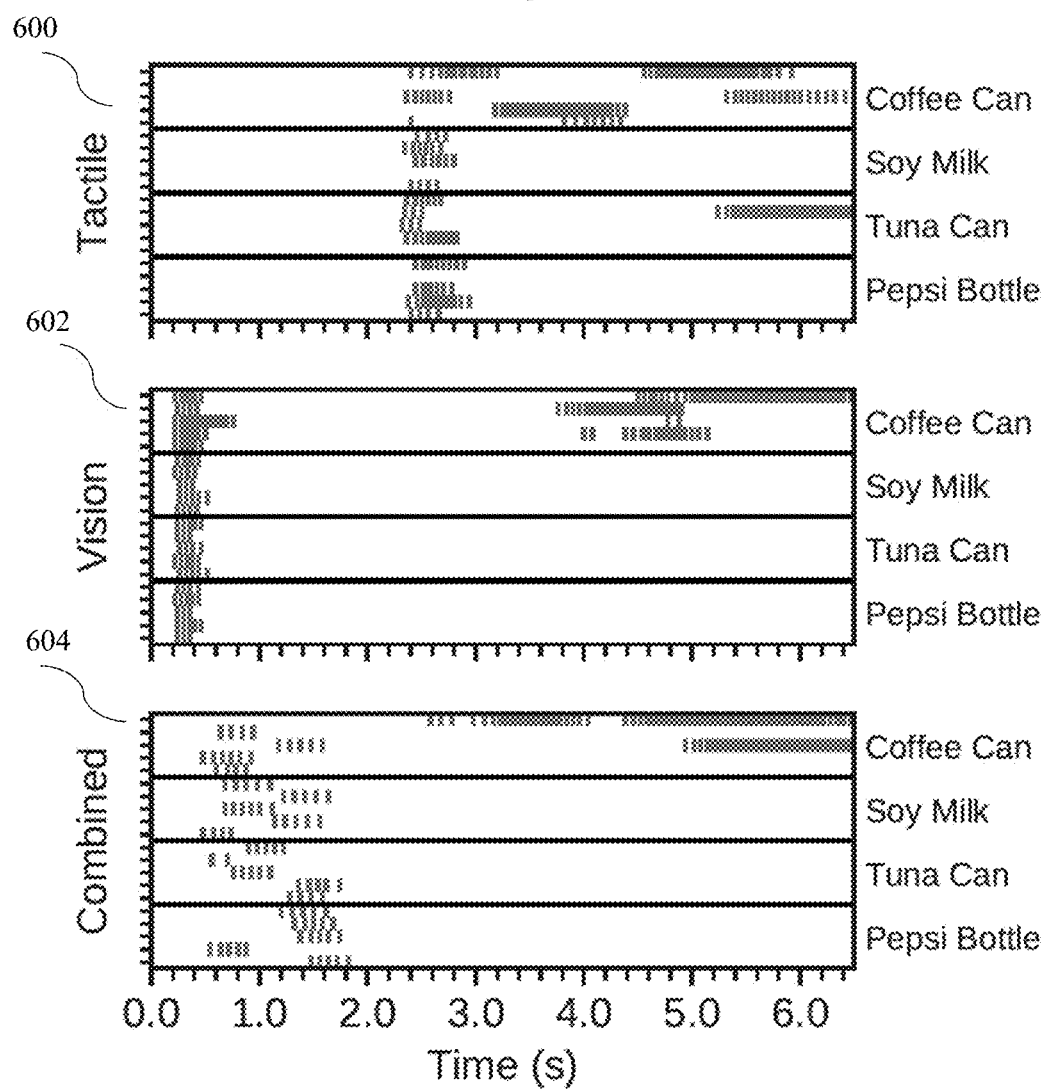
FIG. 6 shows graphs illustrating output spikes for the models trained with different modalities with correct and incorrect predictions, while grasping a coffee can with 100% weight in a classification task using a VT-SNN according to an example embodiment and a tactile (only) model and a vision (only) model for comparison.

FIG. 6 gives an instructive example showing the advantage of fusing both modalities according to an example embodiment, showing the output spikes from the different SNN models while grasping a coffee can with 100% weight. The weight categories are arranged from 0% to 100% (bottom to top) for each container class. The models trained on tactile and vision data in graphs 600 and 602, respectively, are uncertain of the container and the weight category, respectively. Specifically, it can be seen that the tactile model 600 is unable to discern between tuna can and coffee can. On the other hand, the vision model 602 correctly predicts the container (i.e. coffee can) but is unsure about the weight category. The combined visual-tactile model according to an example embodiment in graph 604 incorporates information from both the modalities and is able to predict the correct class (both container and weight categories, i.e. coffee can with 100% weight) with high certainty.

Referring again to Table I, the SNN models performed far better than the ANN (MLP-GRU) models, particularly for the combined visual-tactile data. The poor performance was possibly due to the relatively long sample durations (325 time-steps) and the large number of parameters in the ANN models, relative to the size of the dataset.

Figure 7:
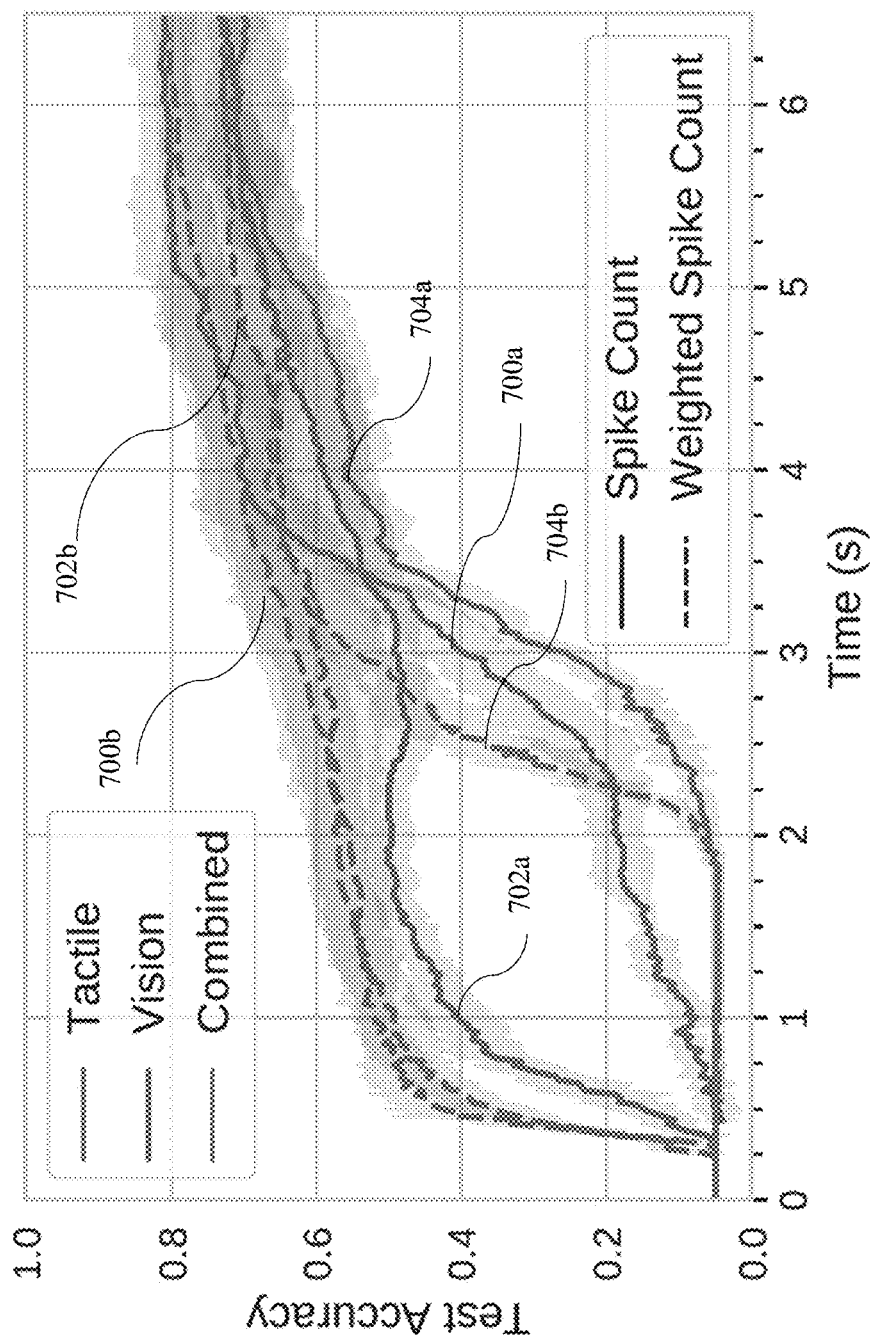
FIG. 7 shows a graph illustrating container and weight classification accuracy over time in a classification task using a VT-SNN according to an example embodiment and a tactile (only) model and a vision (only) model for comparison.

I.2.2. Early Classification, Including VT-SNN According to an Example Embodiment Instead of waiting for all the output spikes to accumulate, early classification can be performed based on the number of spikes seen up to time t. FIG. 7 shows the accuracies of the different models over time. Both combined visual-tactile model 700a, b according to an example embodiment achieves the highest accuracies overall, but between 0.5-3.0 s, both vision models 702a, b were already able to distinguish between certain objects. This is believed to be due to small movements (of the mounted camera) as the gripper closed, which resulted in changes perceived by the Onboard. As expected, tactile spikes do not emerge until contact is made with the object at ~2 s, for both models 704a, b.

In FIG. 7 lines show average test accuracy and shaded regions represent the standard deviations. Although the two losses $\mathcal{L}$ and $\mathcal{L}_{\omega}$ have similar "final" accuracies, it can be seen from FIG. 7 that has a significant impact on test accuracies over time, see 700b, 702b and 704b, as compared to 700a, 702a, and 704a. This effect is most clearly seen for the combined visual-tactile model; the $\mathcal{L}_{\omega}$ variant 700b has a similar early accuracy profile as vision 702a, b, but achieves better performance as tactile information is accumulated for times beyond 2 s.

II. Rotational Slip Classification According to Example Embodiments

In this second experiment, the perception system according to example embodiments was used to classify rotational slip, which is important for stable grasping; stable grasp points can be incorrectly predicted for objects with center-of-mass that are not easily determined by sight, e.g., a hammer and other irregularly-shaped items. Accurate detection of rotational slip will allow the controller to re-grasp the object and remedy poor initial grasp locations. However, to be effective, slip detection needs to be performed accurately and rapidly.

II.1. Method and Procedure According to Example Embodiments

II.1.1. Objects Used According to Example Embodiments

Figure 8:
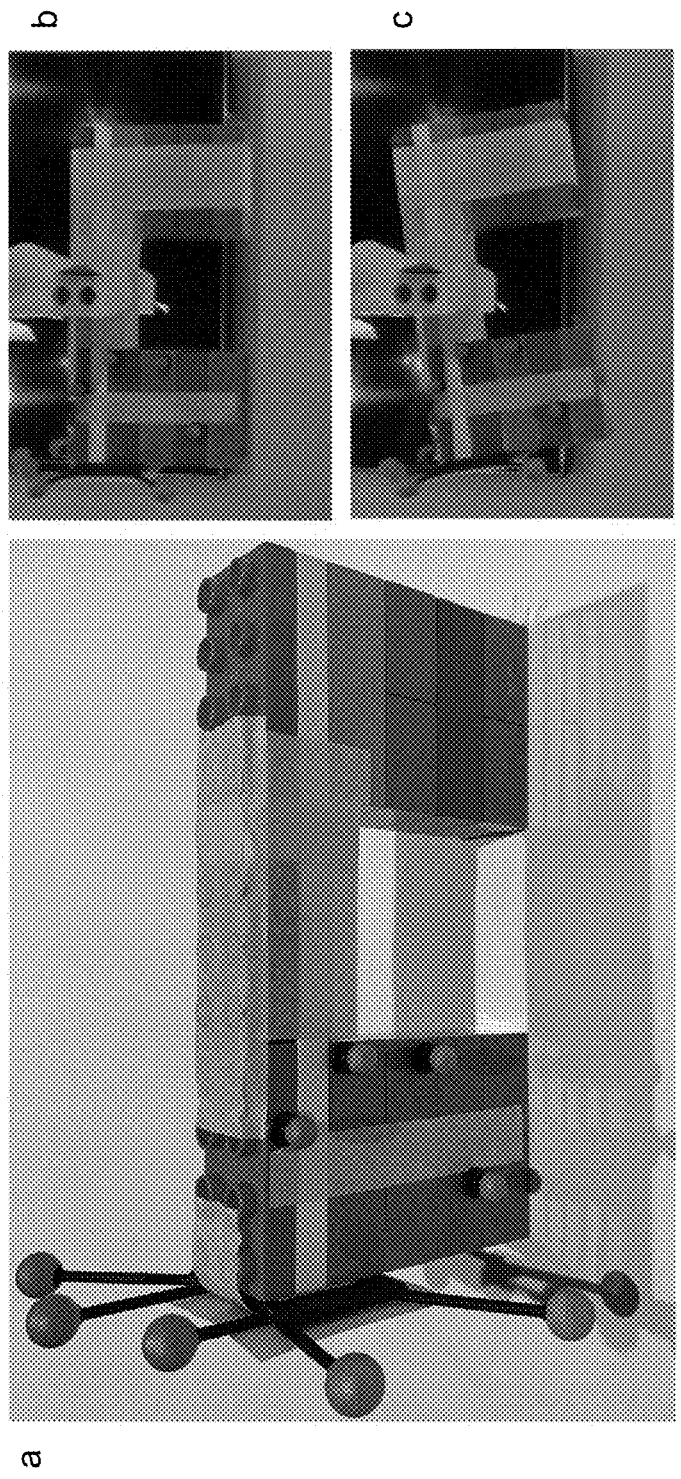
FIG. 8 (a) shows a photograph of an object for a Slip Classification Task with attached OptiTrack markers using a VT-SNN according to an example embodiment and a tactile (only) model and a vision (only) model for comparison.

The test object was constructed using Lego Duplo blocks (see FIG. 8) with a hidden 10 g mass in each leg. The "control" object was designed to be balanced at the grasp point. To induce rotational slip, d the object was modified by transferring the hidden mass from the right leg to the left. As such, the stable and unstable objects were visually identical and had the same overall weight.

II.1.2. Robot Motion According to Example Embodiments

The robot would grasp and lift both object variants 50 times, yielding 50 samples per class. Similar to the previous experiment, motion trajectories were computed using the MoveIt Cartesian Pose Controller [47]. The robot was instructed to close upon the object, lift by 10 cm off the table (in 0.75 seconds) and hold it for an additional 4.25 seconds. We tuned the gripper's grasping force to enable the object to be lifted, yet allow for rotational slip for the off-center object (see FIG. 8, right).

II.1.3. Data Preprocessing According to Example Embodiments

Instead of training the models across the entire movement period, a short time period was extracted in the lifting stage. The exact start time was obtained by analyzing the OptiTrack data; specifically, the baseline orientation distribution (for 1 second or 120 frames) was obtained and rotational slip was defined as an orientation larger (or smaller) than 98% of the baseline frames lasting more than four consecutive OptiTrack frames. It was found that slip occurred almost immediately during the lifting. Since the interest was in rapid detection, a 0.15 s window was extracted around the start of the lift, and a bin duration of 0.001 s (150 bins) with binning threshold $S_{min}=1$ were set. Again, stratified K-folds was used to obtain 5 splits, where each split contained 80 training examples and 20 testing examples.

II.1.4. Classification Models, Including VT-SNN According to an Example Embodiment The model setup and optimization procedure are identical to the previous task/experiment, with 3 slight modifications. First, the output size is reduced to 2 for the binary labels. Second, the sequence length for the ANN GRUs were set to 150, the number of time bins. Third, the SNN's desired true and false spike counts were set to 80 and 5 respectively. Again, SNN and ANN models were compared using (i) the tactile data only, (ii) the visual data only, and (iii) the combined visual-tactile data, including VT-SNN according to an example embodiment II.2. Results and Analysis II.2.1. Model Comparisons, Including VT-SNN According to an Example Embodiment The test accuracy of the models are summarized in in Table 3. For both the SNN and ANN, both the vision and multi-modal models achieve 100% accuracy. This suggests that vision data is highly indicative of slippage, which is unsurprising as rotational slip would produce a visually distinctive signature. Using only tactile events, the SNN and MLP-GRU achieve 91% (with $L_w$) and 87% accuracy respectively.

TABLE 3

| Model | Tactile | Vision | Combined |
| --- | --- | --- | --- |
| SNN ($\mathcal{L}$) | 0.82 (0.045) | 1.00 (0.000) | 1.00 (0.000) |
| SNN ($\mathcal{L}_{\omega}$) | 0.91 (0.020) | 1.00 (0.000) | 1.00 (0.000) |
| ANN (MLP-GRU) | 0.87 (0.059) | 1.00 (0.000) | 1.00 (0.000) |
| ANN (CNN-3D) | 0.44 (0.086) | 0.55 (0.100) | 0.77 (0.117) |

Figure 9:
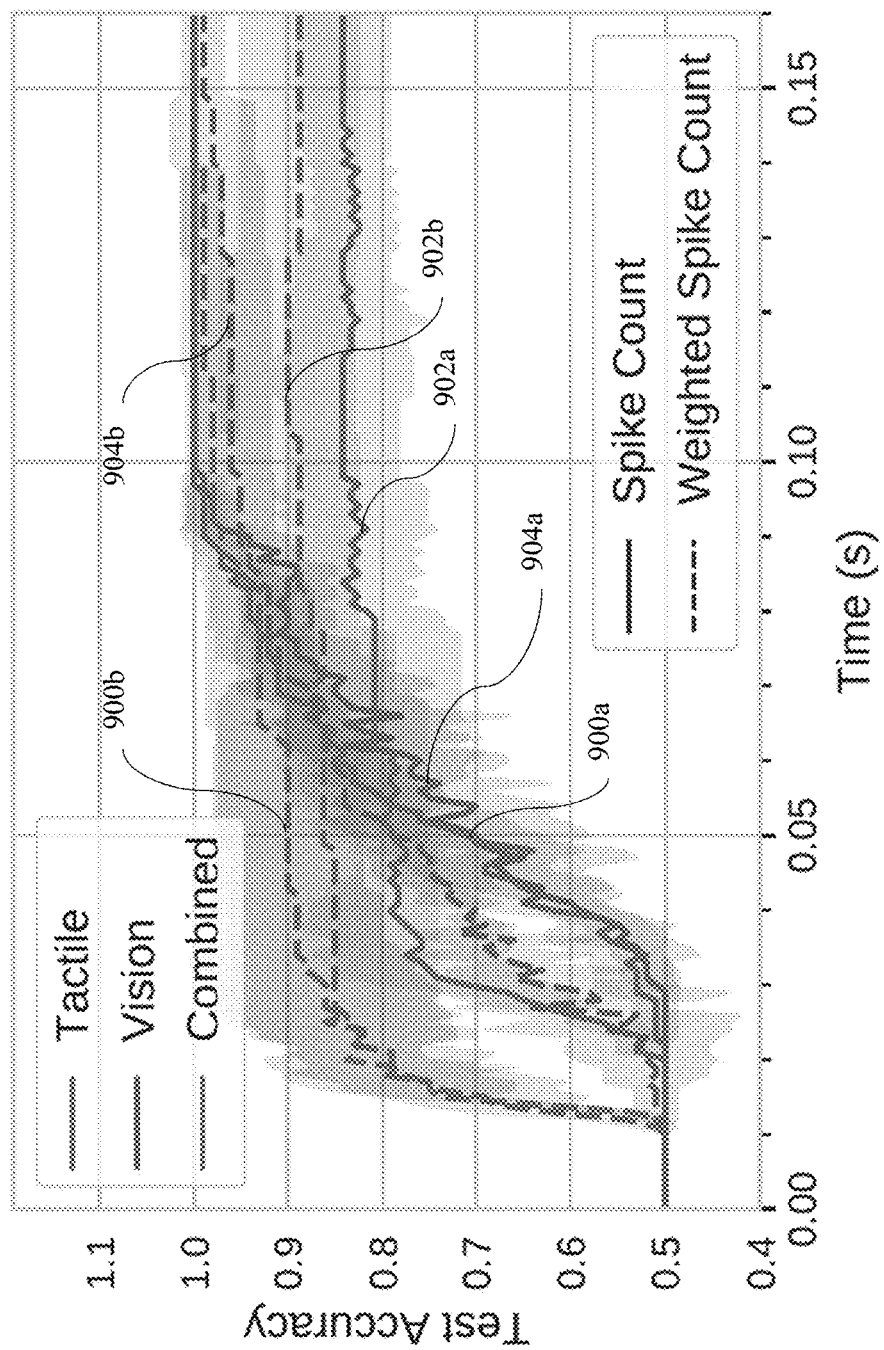
FIG. 9 shows a graph illustrating slip classification accuracy over time in a classification task using a VT-SNN according to an example embodiment and a tactile (only) model and a vision (only) model for comparison.

II.2.2. Early Slip Detection, Including VT-SNN According to an Example Embodiment Similar to the previous analysis on early container classification, FIG. 9 summarizes slip test accuracy at different time points. The object starts being lifted at approximately 0.01 s, and it is seen that by 0.1 s, the multi-modal VT-SNN 900a, b according to an example embodiment is able to classify slip perfectly. Again, it is seen that vision and touch possess different accuracy profiles; tactile-only classification 902a, b is more accurate than VT-SNN with spike count 900a early on (between 0.01-0.05 s), while vision-based classification 904a, b is better than tactile-based 902a, b after ~0.6 s.

For all SNNs, models trained with weighted spike count loss 900b, 902b, 904b achieves better early classification compared to spike count loss 900a, 902a, 904a, noting that early classification accuracy of the VT-SNN with weighted spike count loss 900b achieves essentially the same early classification accuracy as the tactile-based classification with weighted spike count loss 902*b*

III. Speed and Power Efficiency According to Example Embodiments

The inference speed and energy utilization of the classification model (using the VT-SNN with spike-count loss according to an example embodiment, noting that weighted spike count loss should not affect the power consumption) on both a GPU (Nvidia GeForce RTX 2080 Ti) and the Intel Loihi were compared.

Specifically, the multi-modal VT-SNN was trained using the SLAYER framework, such that it ran identically on both the Loihi and via simulation on the GPU. The model is identical to that described in the previous sections except two changes: 1) The Loihi neuron model is used in place of the SRM neuron model. 2) The polarity of the vision output is discarded to reduce the vision input size to into a single core on the Loihi.

Both models attain 100% test accuracy, and produce identical results on the Loihi and the GPU. All benchmarks were obtained for the Loihi using NxSDK version 0.9.5 on a Nahuku 32 board, and on a Nvidia RTX 2080Ti GPU respectively.

The model is tasked to perform 1000 forward passes, with a batch size of 1 on the GPU. The dataset of 1000 samples is obtained by repeating samples from our test set. Each sample consists of 0.15 s of spike data, binned every 1 ms into a 150 timesteps.

Latency measurement: on the GPU, the system clock on the CPU was used to capture the start (tstart) and end time (tend) for model inference, and on the Loihi, we used the system clock on superhost. We compute the latency per timestep as $(t_{end} - t_{start})/(1000 \times 150)$, dividing across 1000 samples, each with 150 timesteps.

Power Utilization Measurement: To obtain power utilization on the GPU, the approach in [52] and used the NVIDIA System Management Interface, logging (timestamp, power draw) pairs at 200 ms intervals with the utility. The power draw during the time spent was extracted, and averaged to obtain the average power draw under load. To obtain the idle power draw of the GPU, power usage on the GPU was logged for 15 minutes with no processes running on the GPU, and the power draw was averaged over the period. The performance profiling tools available within NxSDK 0.9.5 were used to obtain the power utilization for the VT-SNN on the Loihi. The model according to an example embodiment is small and occupies less than 1 chip on the 32-chip Nahuku 32 board. To obtain more accurate power measurements, the workload was replicated 32 times and the results reported per-copy. The replicated workload occupies 594 neuromorphic cores and 5×86 cores, with 624 neuromorphic cores powered for barrier synchronization To simulate a real-world setting (where data arrives in an online sequential manner), 1) the x86 cores are artificially slowed down to match the 1 ms timestep duration of the data. 2) an artificial delay of 0.15 s is introduced to the dataset fetch for the GPU, to simulate waiting for the full window of data before it is able to perform inference.

The benchmark results are shown in Table 4, where latency is the time taken to process 1 timestep. It was observed that the latency on the Loihi is slightly lower, because it is able to perform the inference as the spiking data arrives. The power consumption on the Loihi is significantly (1900×) lower than on the GPU.

TABLE 4

| Hardware | Latency (μs) | Total Power (mW) |
| --- | --- | --- |
| Loihi | 1039.9 | 32.3 |
| GPU | 1045.6 | 61930 |

Figure 14:
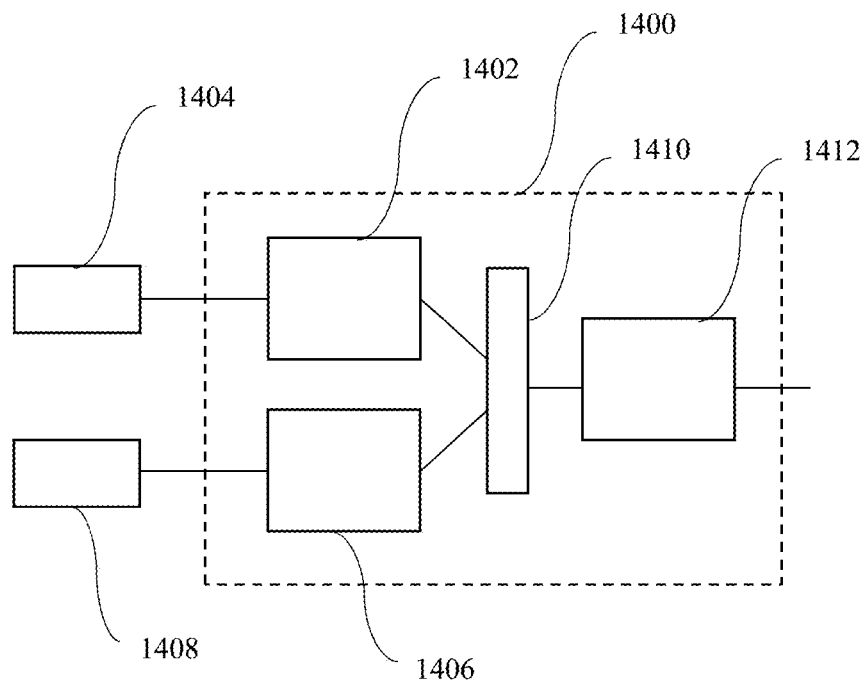
FIG. 14 shows a schematic drawing illustrating a classifying sensing system according to an example embodiment.

FIG. 14 shows a schematic drawing illustrating a classifying sensing system 1400 according to an example embodiment. The system 1400 comprises a first spiking neural network, SNN, encoder 1402 configured for encoding an event based output of a vision sensor 1404 into individual vision modality spiking representations with a first output size; a second SNN encoder 1406 configured for encoding an event based output of a tactile sensor 1408 into individual tactile modality spiking representations with a second output size; a combination layer 1410 configured for merging the vision modality spiking representations and the tactile modality spiking representations; and a task SNN 1412 configured to receive the merged vision modality spiking representations and tactile modality spiking representations and output vision-tactile modality spiking representations with a third output size for classification.

The task SNN 1412 may be configured for classification based on a spike-count loss in the respective output vision/tactile modality representations compared to a desired spike count indexed by the output size. Preferably, the task SNN 1412 is configured for classification based on a weighted spike-count loss in the respective output vision/tactile modality representations compared to a desired weighted spike count indexed by the output size.

Neurons in each of the first SNN encoder 1402, the second SNN encoder 1406, and the task SNN 1412 may be configured for applying a Spike response Model, SRM.

The sensor system 1400 may comprise the tactile sensor 1404. Preferably, the tactile sensor 1404 comprises an event-based tactile sensor. Alternatively, the tactile sensor 1404 comprises a converter for converting an intrinsic output of the tactile sensor 1404 into the event-based output of the tactile sensor 1404.

The sensor system 1400 may comprise the vision sensor 1408. Preferably, the vision sensor 1408 comprises an event-based vision sensor. Alternatively, the vision sensor 1408 comprises a converter for converting an intrinsic output of the vision sensor into the event-based output of the vision sensor 1408.

The sensor system 1400 may comprise a robot arm and end-effector. The end-effector may comprise a gripper. Preferably, the tactile sensor 1406 may comprise one tactile element on each finger of the gripper.

The vision sensor 1408 may be mounted on the robot arm or on the end-effector.

Figure 15:
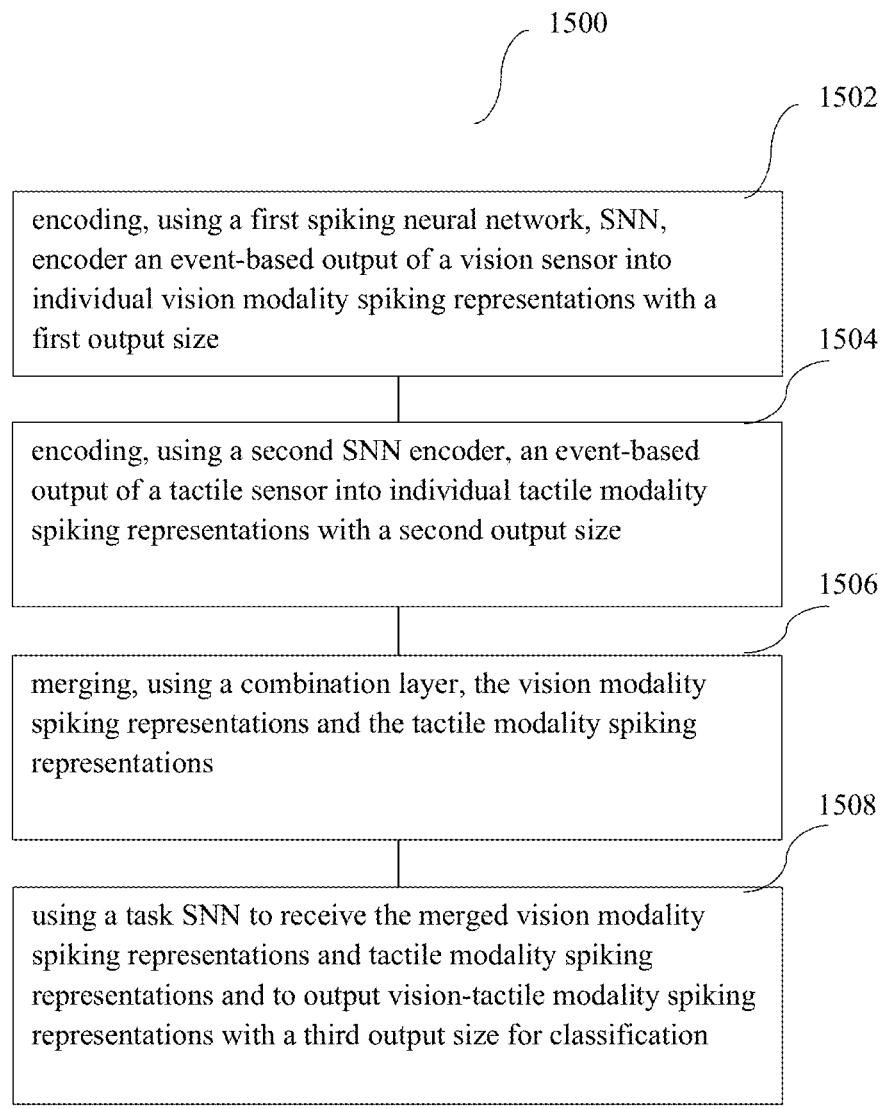
FIG. 15 shows a flowchart illustrating a classifying method performed using a sensing system, according to an example embodiment.

FIG. 15 shows a flowchart 1500 illustrating a classifying method performed using a sensing system, according to an example embodiment. At step 1502, an event-based output of a vision sensor is encoded, using a first spiking neural network, SNN, encoder, into individual vision modality spiking representations with a first output size. At step 1504, an event-based output of a tactile sensor is encoded, using a second SNN encoder, into individual tactile modality spiking representations with a second output size. At step 1506, the vision modality spiking representations and the tactile modality spiking representations are merged, using a combination layer. At step 1508, using a task SNN to receive the merged vision modality spiking representations and tactile modality spiking representations and to output vision-tactile modality spiking representations with a third output size for classification, using a task SNN to receive the concatenated vision modality spiking representations and tactile modality spiking representations.

The task SNN may be configured for classification based on a spike-count loss in the respective output vision/tactile modality representations compared to a desired spike count indexed by the output size. Preferably, the task SNN is configured for classification based on a weighted spike-count loss in the respective output vision/tactile modality representations compared to a desired weighted spike count indexed by the output size.

Each of the first SNN encoder, the second SNN encoder, and the task SNN may be configured for applying a Spike response Model, SRM.

Preferably, the tactile sensor comprises an event-based tactile sensor. Alternatively, the tactile sensor comprises a converter for converting an intrinsic output of the tactile sensor into the event-based output of the tactile sensor.

Preferably, the vision sensor comprises an event-based vision sensor. Alternatively, the vision sensor comprises a converter for converting an intrinsic output of the vision sensor into the event-based output of the vision sensor.

The method may comprise disposing one tactile element of the tactile sensor on each finger of a gripper of a robot arm.

The method may comprise mounting the vision sensor on the robot arm or on the end-effector.

Figure 16:
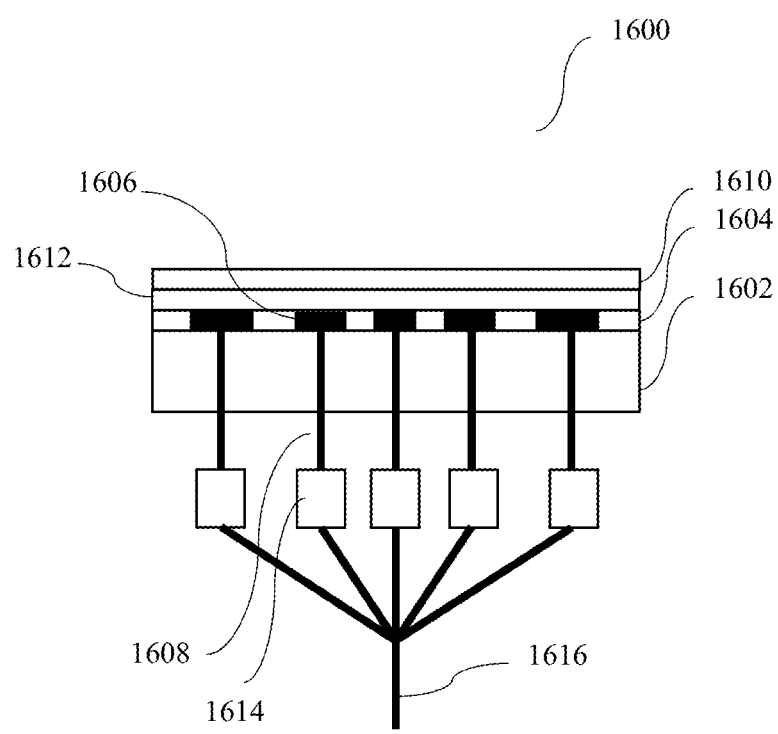
FIG. 16 shows a schematic diagram illustrating a tactile sensor according to an example embodiment.

FIG. 16 shows a schematic diagram illustrating a tactile sensor 1600 comprising a carrier structure 1602, an electrode layer 1604 disposed on a surface of the carrier structure 1602, the electrode array 1604 comprising an array of taxel electrodes e.g. 1606, a plurality of electrode lines e.g. 1608 individually electrically connected to respective ones of the taxel electrodes e.g. 1602; a protective layer 1610 disposed above the electrode layer 1604, wherein the protective layer 1610 is made from an elastically deformable material; and a pressure transducer layer 1612 disposed between the electrode layer 1604 and the protective layer 1610; wherein electrical signals detectable in the electrode lines e.g. 1608 responsive to contact forces exerted on the pressure transducer layer 1612 via the protective layer 1610 provide spatio-temporal data for neuromorphic tactile sensing applications.

The taxel electrodes e.g. 1606 of the electrode array may be arranged with a radially varying density around a centre of the electrode array. The density of the taxel electrodes e.g. 1606 may decrease with radial distance from of the centre.

The tactile sensor may comprise a plurality of encoder elements e.g. 1614 connected to respective ones of the electrode lines e.g. 1608, the decoder elements e.g. 1614 configured to asynchronously transmit tactile information based on the electrical signals in the electrode lines e.g. 1608 via a common output conductor 1616.

The carrier structure 1602 may be configured to be connectable to a robotic gripper.

The electrode layer 1604 and/or the electrode lines e.g. 1608 may be flexible.

Figure 17:
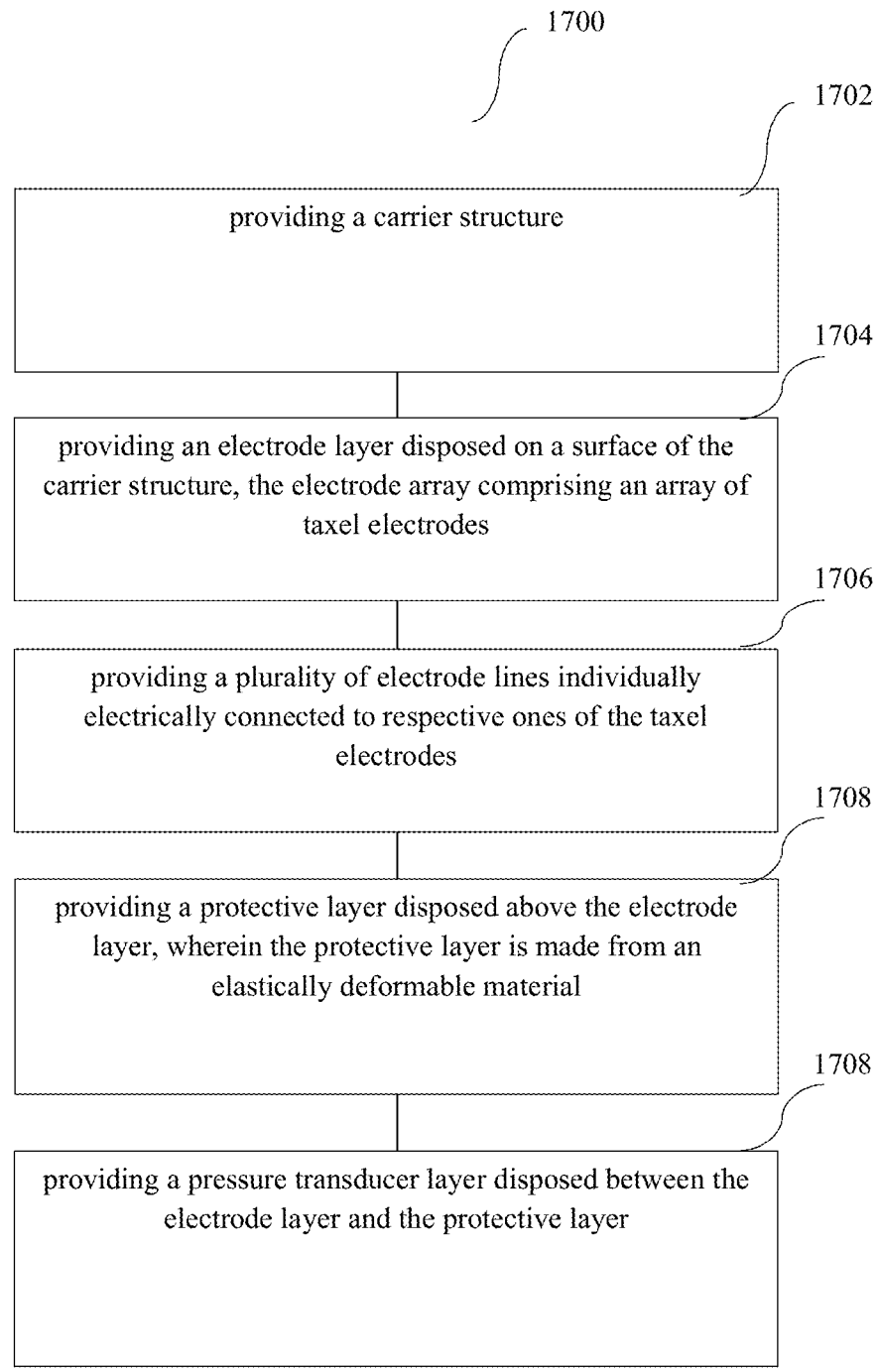
FIG. 17 shows a flowchart illustrating a method of fabricating a tactile sensor, according to an example embodiment.

FIG. 17 shows a flowchart 1700 illustrating a method of fabricating a tactile sensor, according to an example embodiment. At step 1702, a carrier structure is provided. At step 1704, an electrode layer is disposed on a surface of the carrier structure, the electrode array comprising an array of taxel electrodes. At step 1706, a plurality of electrode lines individually electrically connected to respective ones of the taxel electrodes is provided. At step 1708, a protective layer is disposed above the electrode layer, wherein the protective layer is made from an elastically deformable material. At step 1710, a pressure transducer layer is disposed between the electrode layer and the protective layer, wherein electrical signals detectable in the electrode lines responsive to contact forces exerted on the pressure transducer layer via the protective layer provide spatio-temporal data for neuromorphic tactile sensing applications.

The taxel electrodes of the electrode array may be arranged with a radially varying density around a centre of the electrode array. The density of the taxel electrodes may decrease with radial distance from of the centre.

The method may comprise providing a plurality of encoder elements connected to respective ones of the electrode lines, and configuring the decoder elements to asynchronously transmit tactile information based on the electrical signals in the electrode lines via a common output conductor.

The method may comprise configuring the carrier structure to be connectable to a robotic gripper.

The electrode layer and/or the electrode lines may be flexible.

As described above, an event-based perception framework is provided according to example embodiments that combines vision and touch to achieve better performance on two robot tasks. In contrast to conventional synchronous systems, the event-driven framework according to example embodiments can asynchronously process discrete events and as such, may achieve higher temporal resolution and low latency, with low power consumption.

NeuTouch, a neuromorphic event tactile sensor according to example embodiments, and VT-SNN, a multi-modal spiking neural network that learns from raw unstructured event data according to example embodiments, have been described. Experimental results on container & weight classification, and rotational slip detection show that combining both modalities according to example embodiments is important for achieving high accuracies.

Embodiments of the present invention can have one or more of the following features and associated benefits/advantages

| Feature | Benefit/Advantage |
|---|---|
| Incorporation of neuromorphic robotic gripping tactile elements with neuromorphic visual inputs | Fast and efficient capture of object deformation and contact mechanics for effective object grasping tasks |
| | Capture dynamic pressure - crucial for dexterous manipulation tasks that require rapid detection of object slippage, object hardness, and local curvature |
| | Capture of dynamic visual elements - object deformation and dynamic changes in the object and environment. |
| End effector gripper designed for robotic grasping with appropriate electrode design and materials | Grasping arbitrary objects with less slippage |
| | Enhance the speed of robotic control loops |
| Addition/removal of taxels (tactile pixels) in NeuTouch can be done | Highly scalable |
| Simple wiring | Tactile information is transmitted via a single common conductor for signalling |
| Flexible form factor | NeuTouch can be designed to conform to a myriad of 3D shapes and surfaces. It can be easily retrofitted onto a wide range of end-effectors, including anthropomorphic robotic hands. |
| Power efficiency | The NeuTouch and the Prophesee camera have energy use in the mW |

| Feature | Benefit/Advantage |
| --- | --- |
| | range. Tested on an experimental neuromorphic chip (the Intel Loihi[2]), the VT-SNN can perform the same number of inferences per second (~350-300) but requiring orders of magnitude less energy per inference compared to standard GPU based machine learning hardware.<br>[2]Davies, Mike, et al. "Loihi: A neuromorphic manycore processor with on-chip learning." IEEE Micro 38.1 (2018): 82-99. |

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive. Also, the invention includes any combination of features described for different embodiments, including in the summary section, even if the feature or combination of features is not explicitly specified in the claims or the detailed description of the present embodiments.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

[1] A. Billard and D. Kragic, "Trends and challenges in robot manipulation," Science, vol. 364, no. 6446, p. eaat8414, 2019.

[2] D. Li, X. Chen, M. Becchi, and Z. Zong, "Evaluating the energy efficiency of deep convolutional neural networks on cpus and gpus," 10 2016, pp. 477-484.

[3] E. Strubell, A. Ganesh, and A. McCallum, "Energy and policy considerations for deep learning in NLP," in Proceedings of the 57th Conference of the Association for Computational Linguistics, ACL 2019, Florence, Italy, Jul. 28-Aug. 2, 2019, Volume 1: Long Papers, 2019, pp. 3645-3650. [Online]. Available: https://doi.org/10.18653/v1/p19-1355

[4] M. Pfeiffer and T. Pfeil, "Deep Learning With Spiking Neurons: Opportunities and Challenges," Frontiers in Neuroscience, vol. 12, no. October, 2018.

[5] S.-C. Liu, B. Rueckauer, E. Ceolini, A. Huber, and T. Delbruck, "Eventdriven sensing for efficient perception: Vision and audition algorithms," IEEE Signal Processing Magazine, vol. 36, no. 6, pp. 29-37, 2019.

[6] Y. A. LeCun, Y. Bengio, and G. E. Hinton, "Deep learning," Nature, vol. 521, no. 7553, pp. 436-444, 2015.

[7] M. Davies, N. Srinivasa, T. Lin, G. Chinya, Y. Cao, S. H. Choday, G. Dimou, P. Joshi, N. Imam, S. Jain, Y. Liao, C. Lin, A. Lines, R. Liu, D. Mathaikutty, S. McCoy, A. Paul, J. Tse, G. Venkataramanan, Y. Weng, A. Wild, Y. Yang, and H. Wang, "Loihi: A neuromorphic manycore processor with on-chip learning," IEEE Micro, vol. 38, no. 1, pp. 82-99, January 2018.

[8] J. Sinapov, C. Schenck, and A. Stoytchev, "Learning relational object categories using behavioral exploration and multimodal perception," in 2014 IEEE International Conference on Robotics and Automation (ICRA). IEEE, 2014, pp. 5691-5698.

[9] Y. Gao, L. A. Hendricks, K. J. Kuchenbecker, and T. Darrell, "Deep learning for tactile understanding from visual and haptic data," in 2016 IEEE International Conference on Robotics and Automation (ICRA). IEEE, 2016, pp. 536-543.

[10] J. Li, S. Dong, and E. Adelson, "Slip detection with combined tactile and visual information," in 2018 IEEE International Conference on Robotics and Automation (ICRA). IEEE, 2018, pp. 7772-7777.

[11] M. A. Lee, Y. Zhu, K. Srinivasan, P. Shah, S. Savarese, L. Fei-Fei, A. Garg, and J. Bohg, "Making sense of vision and touch: Self-supervised learning of multimodal representations for contact-rich tasks," in 2019 International Conference on Robotics and Automation (ICRA). IEEE, 2019, pp. 8943-8950.

[12] J. Lin, R. Calandra, and S. Levine, "Learning to identify object instances by touch: Tactile recognition via multimodal matching," in 2019 International Conference on Robotics and Automation (ICRA). IEEE, 2019, pp. 3644-3650.

[13] H. Liu, F. Sun et al., "Robotic tactile perception and understanding," 2018.

[14] P. Allen, "Surface descriptions from vision and touch," in Proceedings. 1984 IEEE International Conference on Robotics and Automation, vol. 1. IEEE, 1984, pp. 394-397.

[15] S. Luo, J. Bimbo, R. Dahiya, and H. Liu, "Robotic tactile perception of object properties: A review," Mechatronics, vol. 48, pp. 54-67, 2017.

[16] H. Liu, Y. Yu, F. Sun, and J. Gu, "Visual—tactile fusion for object recognition," IEEE Transactions on Automation Science and Engineering, vol. 14, no. 2, pp. 996-1008, 2016.

[17] H. Soh, Y. Su, and Y. Demiris, "Online spatio-temporal Gaussian process experts with application to tactile classification," in Intelligent Robots and Systems (IROS), 2012 IEEE/RSJ International Conference on. IEEE, 2012, pp. 4489-4496.

[18] J. Varley, D. Watkins, and P. Allen, "Visual-tactile geometric reasoning," in RSS Workshop, 2017.

[19] J. Reinecke, A. Dietrich, F. Schmidt, and M. Chalon, "Experimental comparison of slip detection strategies by tactile sensing with the Biotac® on the dlr hand arm system," in 2014 IEEE international Conference on Robotics and Automation (ICRA). IEEE, 2014, pp. 2742-2748.

[20] Y. Bekiroglu, R. Detry, and D. Kragic, "Learning tactile characterizations of object- and pose-specific grasps," in 2011 IEEE/RSJ international conference on Intelligent Robots and Systems. IEEE, 2011, pp. 1554-1560.

[21] Z. Su, K. Hausman, Y. Chebotar, A. Molchanov, G. E. Loeb, G. S. Sukhatme, and S. Schaal, "Force estimation and slip detection/classification for grip control using a biomimetic tactile sensor," in 2015 IEEE-RAS 15th International Conference on Humanoid Robots (Humanoids). IEEE, 2015, pp. 297-303.

[22] W. Yuan, S. Dong, and E. H. Adelson, "Gelsight: High-resolution robot tactile sensors for estimating geometry and force," Sensors, vol. 17, no. 12, p. 2762, 2017.

[23] R. Calandra, A. Owens, D. Jayaraman, J. Lin, W. Yuan, J. Malik, E. H. Adelson, and S. Levine, "More than a feeling: Learning to grasp and regrasp using vision and touch," IEEE Robotics and Automation Letters, vol. 3, no. 4, pp. 3300-3307, 2018.

[24] S. Luo, W. Yuan, E. Adelson, A. G. Cohn, and R. Fuentes, "Vitac: Feature sharing between vision and tactile sensing for cloth texture recognition," in 2018 IEEE International Conference on Robotics and Automation (ICRA). IEEE, 2018, pp. 2722-2727.

[25] G. Gallego, T. Delbr, G. Orchard, C. Bartolozzi, B. Taba, A. Censi, K. Daniilidis, D. Scaramuzza, S. Leutenegger, and A. Davison, "Eventbased Vision: A Survey," Tech. Rep., 2018.

[26] A. Mitrokhin, C. Ye, C. Fermuller, Y. Aloimonos, and T. Delbruck, "EVIMO: Motion Segmentation Dataset and Learning Pipeline for Event Cameras," in 2019 IEEE/RSJ International Conference on Intelligent Robots and Systems (IROS), 2019.

[27] A. Z. Zhu and L. Yuan, "EV-FlowNet: Self-Supervised Optical Flow Estimation for Event-based Cameras," in Robotics: Science and Systems, 2018.

[28] A. I. Maqueda, A. Loquercio, G. Gallego, N. Garcn'nia, and D. Scaramuzza, "Event-based vision meets deep learning on steering prediction for self-driving cars," in Proceedings of the IEEE Conference on Computer Vision and Pattern Recognition, 2018, pp. 5419-5427.

[29] A. Tavanaei, M. Ghodrati, S. R. Kheradpisheh, T. Masquelier, and A. Maida, "Deep learning in spiking neural networks," Neural Networks, vol. 111, pp. 47-63, 2019. [Online]. Available: https://doi.org/10.1016/j.neunet.2018.12.002

[30] S. B. Shrestha and G. Orchard, "Slayer: Spike layer error reassignment in time," in Advances in Neural Information Processing Systems, 2018, pp. 1412-1421.

[31] G. Bellec, F. Scherr, E. Hajek, D. Salaj, R. Legenstein, and W. Maass, "Biologically inspired alternatives to backpropagation through time for learning in recurrent neural nets," arXiv preprint arXiv:1901.09049, 2019.

[32] M. Akrout, C. Wilson, P. Humphreys, T. Lillicrap, and D. B. Tweed, "Deep learning without weight transport," in Advances in Neural Information Processing Systems, 2019, pp. 974-982.

[33] P. A. Merolla, J. V. Arthur, R. Alvarez-Icaza, A. S. Cassidy, J. Sawada, F. Akopyan, B. L. Jackson, N. Imam, C. Guo, Y. Nakamura, B. Brezzo, I. Vo, S. K. Esser, R. Appuswamy, B. Taba, A. Amir, M. D. Flickner, W. P. Risk, R. Manohar, and D. S. Modha, "A million spikingneuron integrated circuit with a scalable communication network and interface," Science, vol. 345, no. 6197, pp. 668-673, 2014. [Online]. Available: https://scienc-e.sciencemag.org/content/345/6197/668

[34] S. Chevallier, H. Paugam-Moisy, and F. Lemaˆitre, "Distributed processing for modelling real-time multimodal perception in a virtual robot." in Parallel and Distributed Computing and Networks, 2005, pp. 393-398.

[35] N. Rathi and K. Roy, "Stdp-based unsupervised multimodal learning with cross-modal processing in spiking neural network," IEEE Transactions on Emerging Topics in Computational Intelligence, pp. 1-11, 2018.

[36] E. Mansouri-Benssassi and J. Ye, "Speech emotion recognition with early visual cross-modal enhancement using spiking neural networks," in 2019 International Joint Conference on Neural Networks (IJCNN). IEEE, 2019, pp. 1-8.

[37] T. Zhou and J. P. Wachs, "Spiking neural networks for early prediction in human-robot collaboration," The International Journal of Robotics Research, vol. 38, no. 14, pp. 1619-1643, 2019. [Online]. Available: https://doi.org/10.1177/0278364919872252

[38] J. Konstantinova, A. Jiang, K. Althoefer, P. Dasgupta, and T. Nanayakkara, "Implementation of tactile sensing for palpation in robot-assisted minimally invasive surgery: A review," IEEE Sensors Journal, vol. 14, no. 8, pp. 2490-2501, 2014.

[39] Y. Wu, Y. Liu, Y. Zhou, Q. Man, C. Hu, W. Asghar, F. Li, Z. Yu, J. Shang, G. Liu et al., "A skin-inspired tactile sensor for smart prosthetics," Science Robotics, vol. 3, no. 22, p. eaat0429, 2018.

[40] Q.-J. Sun, X.-H. Zhao, Y. Zhou, C.-C. Yeung, W. Wu, S. Venkatesh, Z.-X. Xu, J. J. Wylie, W.-J. Li, and V. A. Roy, "Fingertip-skin-inspired highly sensitive and multifunctional sensor with hierarchically structured conductive graphite/polydimethylsiloxane foams," Advanced Functional Materials, vol. 29, no. 18, p. 1808829, 2019.

[41] J. He, P. Xiao, W. Lu, J. Shi, L. Zhang, Y. Liang, C. Pan, S.-W. Kuo, and T. Chen, "A universal high accuracy wearable pulse monitoring system via high sensitivity and large linearity graphene pressure sensor," Nano Energy, vol. 59, pp. 422-433, 2019.

[42] T. Callier, A. K. Suresh, and S. J. Bensmaia, "Neural coding of contact events in somatosensory cortex," Cerebral Cortex, vol. 29, no. 11, pp. 4613-4627, 2019.

[43] W. W. Lee, Y. J. Tan, H. Yao, S. Li, H. H. See, M. Hon, K. A. Ng, B. Xiong, J. S. Ho, and B. C. Tee, "A neuro-inspired artificial peripheral nervous system for scalable electronic skins," Science Robotics, vol. 4, no. 32, p. eaax2198, 2019.

[44] R. S. Johansson and J. R. Flanagan, "Coding and use of tactile signals from the fingertips in object manipulation tasks," Nature Reviews Neuroscience, vol. 10, no. 5, pp. 345-359, 2009.

[45] W. Gerstner, "Time structure of the activity in neural network models," Physical review E, vol. 51, no. 1, p. 738, 1995.

[46] B. Calli, A. Walsman, A. Singh, S. Srinivasa, P. Abbeel, and A. M. Dollar, "Benchmarking in manipulation research: Using the yale-cmuberkeley object and model set," IEEE Robotics Automation Magazine, vol. 22, no. 3, pp. 36-52, September 2015.

[47] D. Coleman, I. Sucan, S. Chitta, and N. Correll, "Reducing the barrier to entry of complex robotic software: a moveit! case study," arXiv preprint arXiv:1404.3785, 2014.

[48] K. Cho, B. van Merriënboer, C. Gulcehre, D. Bandanau, F. Bougares, H. Schwenk, and Y. Bengio, "Learning phrase representations using rnn encoder—decoder for statistical machine translation," in Proceedings of the 2014 Conference on Empirical Methods in Natural Language Processing (EMNLP), 2014, pp. 1724-1734.

[49] P. Blouw, X. Choo, E. Hunsberger, and C. Eliasmith, "Benchmarking keyword spotting efficiency on neuromorphic hardware," 2018, arXiv:1812.01739.

[50] Lee, Wang Wei, et al. "A neuro-inspired artificial peripheral nervous system for scalable electronic skins." Science Robotics 4.32 (2019): eaax2198.

[51] J. M. Gandarias, F. Pastor, A. J. García-Cerezo, and J. M. Gómezde Gabriel, "Active tactile recognition of deformable objects with 3d convolutional neural networks," in 2019 IEEE World Haptics Conference (WHC). IEEE, 2019, pp. 551-555.

[52] P. Blouw, X. Choo, E. Hunsberger, and C. Eliasmith, "Benchmark-ing keyword spotting efficiency on neuromorphic hardware," 2018, arXiv:1812.01739]

The invention claimed is:

1. A classifying sensing system comprising:
   a first spiking neural network, SNN, encoder configured for encoding an event-based output of a vision sensor into individual vision modality spiking representations with a first output size;
   a second SNN encoder configured for encoding an event-based output of a tactile sensor into individual tactile modality spiking representations with a second output size;
   a combination layer configured for merging the vision modality spiking representations and the tactile modality spiking representations; and
   a task SNN configured to receive the merged vision modality spiking representations and tactile modality spiking representations and output vision-tactile modality spiking representations with a third output size for classification.

2. The system of claim 1, wherein the task SNN is configured for classification based on a spike-count loss in the respective output vision/tactile modality representations compared to a desired spike count indexed by the output size.

3. The system of claim 1, wherein the task SNN is configured for classification based on a weighted spike-count loss in the respective output vision/tactile modality representations compared to a desired weighted spike count indexed by the output size.

4. The system of claim 1, wherein neurons in each of the first SNN encoder, the second SNN encoder, and the task SNN are configured for applying a Spike response Model, SRM.

5. The system of claim 1, comprising the tactile sensor.

6. The system of claim 5, wherein the tactile sensor comprises an event-based tactile sensor.

7. The system of claim 1, comprising the vision sensor.

8. The system of claim 1, comprising a robot arm and end-effector.

9. The system of claim 8, wherein the end-effector comprises a gripper.

10. A classifying method performed using a sensing system, the method comprising the steps of:
    encoding, using a first spiking neural network, SNN, encoder an event-based output of a vision sensor into individual vision modality spiking representations with a first output size;
    encoding, using a second SNN encoder, an event-based output of a tactile sensor into individual tactile modality spiking representations with a second output size;
    merging, using a combination layer, the vision modality spiking representations and the tactile modality spiking representations; and
    using a task SNN to receive the merged vision modality spiking representations and tactile modality spiking representations and to output vision-tactile modality spiking representations with a third output size for classification.

11. The method of claim 10, wherein the task SNN is configured for classification based on a spike-count loss in the respective output vision/tactile modality representations compared to a desired spike count indexed by the output size.

12. The method of claim 11, wherein the task SNN is configured for classification based on a weighted spike-count loss in the respective output vision/tactile modality representations compared to a desired weighted spike count indexed by the output size.

13. The system of claim 10, wherein each of the first SNN encoder, the second SNN encoder, and the task SNN is configured for applying a Spike response Model, SRM.

14. The system of claim 10, wherein the tactile sensor comprises an event-based tactile sensor.

* * * * *